US009647415B2

(12) United States Patent
Tsushima et al.

(10) Patent No.: US 9,647,415 B2
(45) Date of Patent: May 9, 2017

(54) LASER APPARATUS AND METHOD OF CONTROLLING LASER APPARATUS

(71) Applicants: Hiroaki Tsushima, Oyama (JP);
Osamu Wakabayashi, Oyama (JP);
Takashi Matsunaga, Oyama (JP)

(72) Inventors: Hiroaki Tsushima, Oyama (JP);
Osamu Wakabayashi, Oyama (JP);
Takashi Matsunaga, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 14/602,208

(22) Filed: Jan. 21, 2015

(65) Prior Publication Data

US 2015/0139258 A1 May 21, 2015

Related U.S. Application Data

(63) Continuation of application No. PCT/JP2013/070110, filed on Jul. 24, 2013.

(30) Foreign Application Priority Data

Jul. 26, 2012 (JP) ................................. 2012-166292

(51) Int. Cl.
*H01S 3/10* (2006.01)
*H01S 3/00* (2006.01)
(Continued)

(52) U.S. Cl.
CPC ........ *H01S 3/09702* (2013.01); *H01S 3/0014* (2013.01); *H01S 3/09705* (2013.01);
(Continued)

(58) Field of Classification Search
CPC ............. H01S 3/09702; H01S 3/09705; H01S 3/0014; H01S 3/08009; H01S 3/0971; H01S 3/2366
See application file for complete search history.

(56) References Cited

U.S. PATENT DOCUMENTS 5,463,650 A * 10/1995 Ito ........................... H01S 3/134
372/25
5,504,766 A 4/1996 Watanabe et al.
(Continued)

FOREIGN PATENT DOCUMENTS

JP 05291649 A 11/1993
JP 09223833 A 8/1997
(Continued)

OTHER PUBLICATIONS

International Search Report dated Oct. 29, 2013, corresponding to PCT/JP2013/070110.

*Primary Examiner* — Yuanda Zhang
(74) *Attorney, Agent, or Firm* — Studebaker & Brackett PC

(57) ABSTRACT

A laser apparatus according to embodiment may include: a laser chamber filled with a laser gain medium; a pair of electrodes disposed in the laser chamber; a charger configured to apply a charge voltage for causing a discharge to occur between the pair of the electrodes; a pulse power module configured to covert the charge voltage applied by the charger into a short pulsed voltage, and apply the short pulsed voltage between the pair of the electrodes; and a controller configured to calculate input energies Ein applied to the pair of the electrodes based on the charge voltage, calculate an integration value Einsum of the input energies Ein by integrating the calculated input energies Ein, and determine whether the integration value Einsum exceeds an integration lifetime value Einsumlife of input energy or not.

12 Claims, 13 Drawing Sheets

(51) Int. Cl.
   *H01S 3/097*    (2006.01)
   *H01S 3/08*     (2006.01)
   *H01S 3/0971*   (2006.01)
   *H01S 3/23*     (2006.01)

(52) U.S. Cl.
   CPC ......... *H01S 3/08009* (2013.01); *H01S 3/0971* (2013.01); *H01S 3/2366* (2013.01)

(56) References Cited

U.S. PATENT DOCUMENTS

| | | | |
|---|---|---|---|
| 5,646,954 A | 7/1997 | Das et al. | |
| 5,657,334 A * | 8/1997 | Das | H01S 3/134 |
| | | | 372/33 |
| 6,028,872 A * | 2/2000 | Partlo | G03F 7/70025 |
| | | | 372/25 |
| 6,097,747 A | 8/2000 | Ichisa et al. | |
| 6,219,367 B1 | 4/2001 | Atsumi | |
| 6,697,695 B1 | 2/2004 | Kurihara et al. | |
| 7,203,562 B2 | 4/2007 | Patel et al. | |
| 7,771,001 B2 | 8/2010 | Miyamoto | |
| 2001/0012311 A1 | 8/2001 | Atsumi | |
| 2003/0042436 A1* | 3/2003 | Hori | H01S 3/038 |
| | | | 250/493.1 |
| 2003/0099270 A1* | 5/2003 | Nakao | H01S 3/09705 |
| | | | 372/55 |
| 2006/0060571 A1* | 3/2006 | Mori | B23K 26/705 |
| | | | 219/121.62 |
| 2006/0239309 A1* | 10/2006 | Ariga | G03F 7/70041 |
| | | | 372/29.021 |
| 2008/0095209 A1* | 4/2008 | Wakabayashi | H01S 3/2333 |
| | | | 372/57 |
| 2013/0100980 A1* | 4/2013 | Abe | H01S 3/036 |
| | | | 372/57 |

FOREIGN PATENT DOCUMENTS

| | | |
|---|---|---|
| JP | 10135542 A | 5/1998 |
| JP | 10275951 A | 10/1998 |
| JP | 11177166 A | 7/1999 |
| JP | 2000349017 A | 12/2000 |
| JP | 2002015986 A | 1/2002 |
| JP | 2002043219 A | 2/2002 |
| JP | 2003243753 A | 8/2003 |
| JP | 2008225047 A | 9/2008 |
| JP | 2009018453 A | 1/2009 |

* cited by examiner

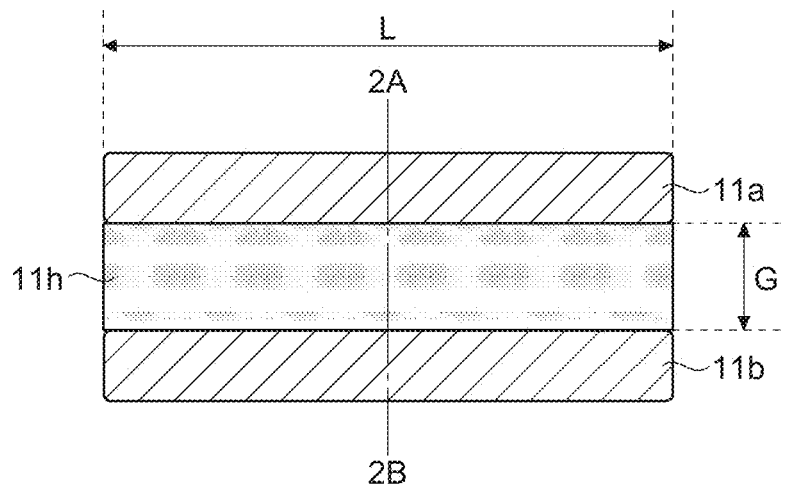
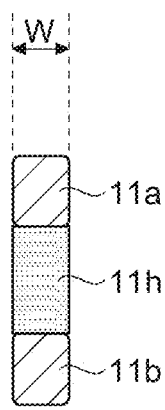

FIG.9

| RANGE OF PULSE ENERGY E [mJ] | INPUT ENERGY [J] |
|---|---|
| E<10 | Eina |
| 10≤E<11.25 | Einb |
| 11.25≤E<13.75 | Einc |
| 13.75≤E<15 | Eind |
| 15≤E | Eine |

LASER APPARATUS AND METHOD OF CONTROLLING LASER APPARATUS

CROSS-REFERENCE TO RELATED APPLICATION

The application is a continuation of PCT International Application No. PCT/JP2013/070110 filed on Jul. 24, 2013 which claims the benefit of priority from Japanese Patent Application No. 2012-166292, filed on Jul. 26, 2012; the entire contents of which are incorporated herein by reference.

BACKGROUND

1. Technical Field

The present disclosure relates to a laser apparatus and a method of controlling a laser apparatus.

2. Related Art

In recent years, for a semiconductor exposure apparatus (hereinafter referred to as an exposure apparatus), a higher resolution is being required as miniaturization and integration of a semiconductor integrated circuit have been progressed. Therefore, wavelength-shortening of light outputted from an exposure apparatus has been developed. Generally, as an exposure apparatus, a gas laser apparatus is used instead of the traditional mercury lamp. For example, as a gas laser apparatus for exposure, a KrF excimer laser outputting an ultraviolet laser beam with 248 nm (nanometer) wavelength or an ArF excimer laser outputting an ultraviolet light beam with 193 nm wavelength may be used.

In a next generation exposure technology, an immersion exposure in which a gap between an exposure lens in an exposure apparatus and a wafer is filled with fluid has been put to practical use. In the immersion exposure, because refraction index between the exposure lens and the wafer is changed, an apparent wavelength of the exposure light source is shortened. In a case where an immersion exposure is conducted using an ArF excimer laser as an exposure light source, a wafer is irradiated with an ultraviolet light beam of which wavelength is equivalent to 134 nm. Such technique may be called as an ArF immersion exposure (or an ArF immersion lithography).

Natural oscillation amplitudes of a KrF excimer laser and an ArF excimer laser are wide such as about 350 to 400 pm (picometer). Therefore, when a projector lens is made by a material which transmits an ultraviolet light beam such as a KrF laser beam or an ArF laser beam, a chromatic distortion may occur. As a result, a resolution may be reduced. Therefore, a spectrum line width of a laser beam outputted from a gas laser apparatus should be narrowed to the extent a chromatic distortion can be ignored. In order to narrow a spectrum line width, in a laser resonator of a gas laser apparatus, a line narrow module (LNM) with a line narrowing element (an etalon, a grating, or the like) may be mounted. In the following, a laser apparatus of which spectrum line width is narrowed may be called as a line narrowed laser apparatus.

SUMMARY

A laser apparatus according to an aspect of the present disclosure may include: a laser chamber filled with a laser gain medium; a pair of electrodes disposed in the laser chamber; a charger configured to apply a charge voltage for causing a discharge to occur between the pair of the electrodes; a pulse power module configured to covert the charge voltage applied by the charger into a short pulsed voltage, and apply the short pulsed voltage between the pair of the electrodes; and a controller configured to calculate input energies Ein applied to the pair of the electrodes based on the charge voltage, calculate an integration value Einsum of the input energies Ein by integrating the calculated input energies Ein, and determine whether the integration value Einsum exceeds an integration lifetime value Einsumlife of input energy or not.

BRIEF DESCRIPTION OF THE DRAWINGS

Hereinafter, selected embodiments of the present disclosure will be described with reference to the accompanying drawings.

FIG. 2A is a side view of electrodes disposed in a laser chamber shown in FIG. 1;

FIG. 2B is a cross-section view showing a cross-section 2A-2B in FIG. 2A;

FIG. 9 is an explanation diagram for explaining a fourth control method of the laser apparatus according to the disclosure;

DETAILED DESCRIPTION

Figure 1:
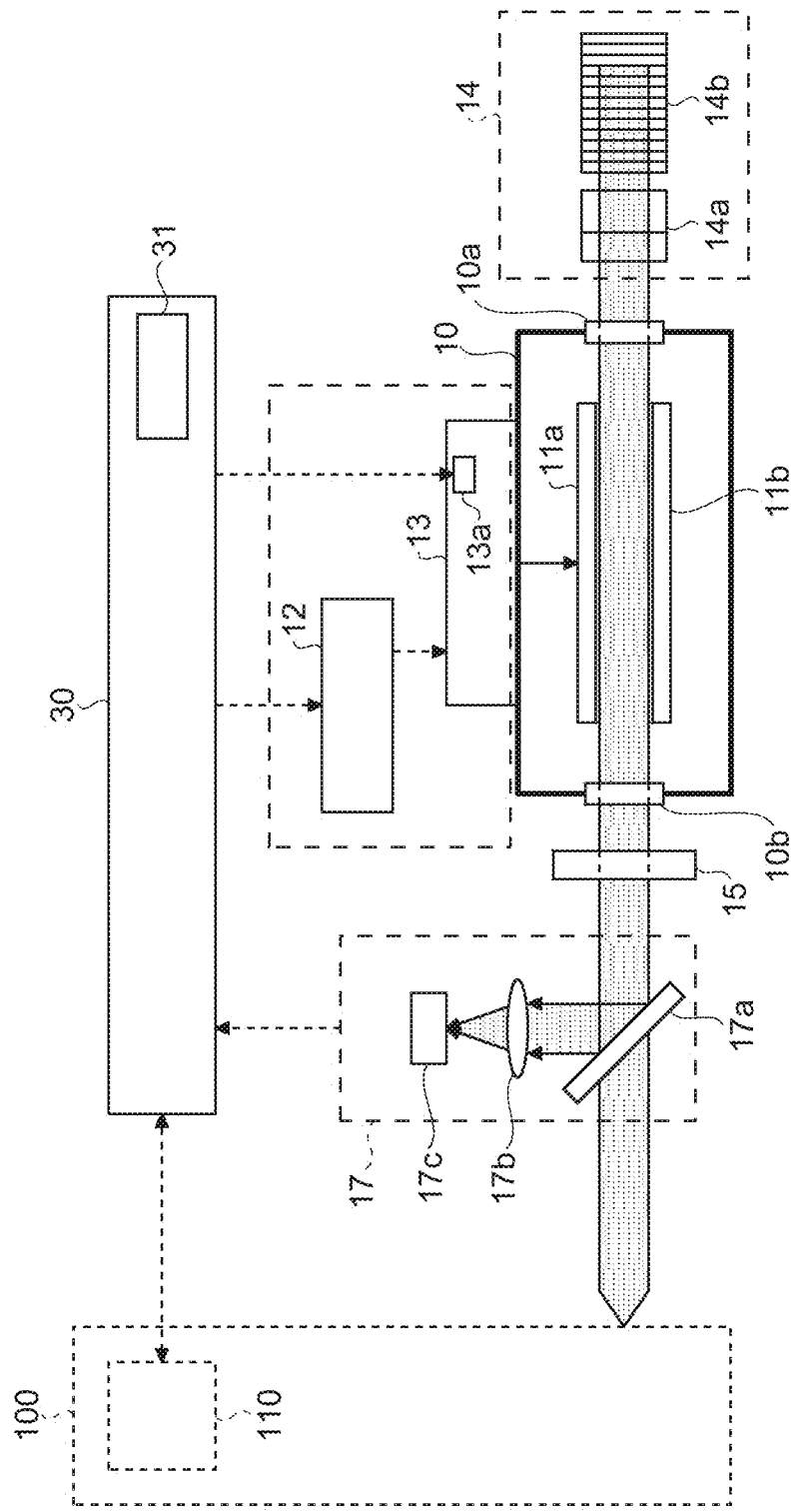
FIG. 1 is a structure diagram of a laser apparatus according to the disclosure.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein. The embodiments of the present disclosure will be described following the table of contents below.

Contents
1. Excimer laser apparatus
1.1 Overview
1.2 Structure
1.3 Operation

2. Life prediction method of excimer laser apparatus
2.1 Prediction and parameters of electrode life
2.2 Relationship between electrode life and input energy
2.3 First prediction method of electrode line
2.4 Second prediction method of electrode line
2.5 Third prediction method of electrode line
2.6 Fourth prediction method of electrode line
3. Life prediction method of double chamber system
3.1 Structure
3.2 Operation
3.3 Prediction method of electrode life in double chamber system

1. Excimer Laser Apparatus

1.1 Overview

Generally, a discharge excited gas laser apparatus for a semiconductor exposure apparatus, which is an excimer laser apparatus, is required to output desired pulse laser beams stably for a long period of time. However, when the excimer laser apparatus oscillates for a long period of time, there is a case where electrodes in a laser chamber deteriorate due to discharge and it becomes impossible to output pulse laser beams with desired energy.

Such lifetime of electrodes in a laser chamber has been predicted based on whether the total number of laser pulses emitted from the laser chamber reaches a predetermined threshold or not. However, because a lifetime of electrodes in a laser chamber varies depending on a degree of energy applied to the electrodes, when the lifetime of the electrodes is determined only based on the total number of laser pulses, it may be difficult to predict the lifetime accurately.

That is, currently, lifetimes of components installed in an excimer laser apparatus (electrodes, optics, or the like) or modules (a laser chamber, optical modules, or the like) are predicted based on the total number of laser pulses. However, a laser apparatus capable of switching pulse energy outputted from an excimer laser apparatus within a range of 10 to 20 mJ depending on a request from an exposure apparatus has been required. In such apparatus, because lifetimes of components and modules are varied depending on input energy and pulse energy of outputted laser beams, it is impossible to predict the lifetimes accurately. Therefore, a laser apparatus capable of predicting lifetimes of components and modules as accurately as possible even when input energy or pulse energy of outputted laser beams is varied has been required.

1.2 Structure

FIG. 1 shows an excimer laser apparatus being one aspect of the disclosure. The excimer laser apparatus (in this specification, it may also be simply referred to as a laser apparatus) may include a laser chamber 10, a charger 12, a pulse power module (PPM) 13, a laser resonator, an energy monitor unit 17 and a controller 30. In the laser chamber 10, ArF laser gas being a laser gain medium may be filled.

The laser chamber 10 may include a pair of electrodes 11a and 11b, and two windows 10a and 10b through which a laser beam passes.

The laser resonator may include a line narrowing module (LNM) 14 and an output coupler (OC) 15. Another configuration of the laser resonator may include a high reflection mirror (HR) instead of the LNM 14. The laser chamber 10 may be located on a light path of the laser resonator.

The LNM 14 may include a prism 14a and a grating 14b. The prism 14a may expand a width of beams. The grating 14b may be arranged by a Littrow arrangement, and the laser apparatus may oscillate with a target wavelength.

The OC 15 may be a partial reflection mirror which reflects a part of a laser beam and through which a part of the laser beam passes.

The energy monitor unit 17 may include a beam splitter 17a, a collector lens 17b and an optical sensor 17c; the beam splitter 17a being disposed on a light path of laser beams outputted from the OC 15.

The PPM 13 may include a capacitor (not shown in FIG. 1), and be connected to the electrodes 11a and 11b, and it may further include a switch 13a. By inputting a trigger signal to the switch 13a, a discharge may occur between the electrodes 11a and 11b. The charger 12 may be connected to the capacitor installed in the PPM 13.

1.3 Operation

The controller 30 may receive signals about a target pulse energy Et and oscillation triggers which are transmitted from an exposure apparatus controller 110 installed in an exposure apparatus 100.

The controller 30 may set, based on the received signals of the target pulse energy Et and the oscillation triggers, a specific charge voltage (Vhv) to the charger 12 so that pulse energy of laser beams becomes the target pulse energy Et. The controller 30 may apply a voltage between the electrodes 11a and 11b by operating the switch 13a disposed in the PPM 13 after elapsing a specific period of time from inputting of each of the oscillation triggers. Thereby, the PPM 13 may convert the charge voltage applied by the charger 12 into a short pulsed voltage, and apply the short pulsed voltage between the electrodes 11a and 11b.

By such applying of the short pulsed voltage, it is possible to cause a discharge to occur between the electrodes 11a and 11b, cause the laser gas to excite, cause lights emitted from the excited laser gas to resonate between the LNM 14 and the OC 15, and cause the resonator to laser-oscillate. At this time, a laser beam line-narrowed by the prism 14a and the grating 14b may be outputted through the OC 15.

The laser beam having been passed through the OC 15 and reflected by the beam splitter 17a may enter the optical sensor 17c. In this way, the laser beam partially reflected by the beam splitter 17a may enter the optical sensor 17c via the collector lens 17b. The optical sensor 17c may detect pulse energy of the laser beam. The laser beam having been passed through the beam splitter 17a may enter the exposure apparatus 100.

The controller 30 may include a storage 31, and the storage 31 may store one or both of the charge voltage Vhv and the outputted pulse energy E.

By repeating the above-described operation, a charge voltage Vhv (Vhv1, Vhv2, . . . , Vhvn) for each pulse may be stored.

The controller 30 may execute a feedback control for determining a charge voltage Vhv to be used for a next laser oscillation based on a difference ΔE between the target pulse energy Et and the energy E detected by the optical sensor 17c.

The controller 30 may predict the lifetimes of the electrodes 11a and 11b installed in the laser chamber 10 based on the charge voltage Vhv (Vhv1, Vhv2, . . . , Vhvn) for each pulse.

2. Life Prediction Method of Excimer Laser Apparatus

2.1 Prediction and Parameters of Electrode Life

A consumption amount of the electrodes 11a and 11b installed in the laser chamber 10 may be influenced by the following parameters.

1) Area S of discharge surface of electrode
2) Applied energy Ein to electrode
3) Consumption rate coefficient α for each electrode material These parameters will be explained below.

1) Area S of Discharge Surface of Electrode

Firstly, a discharge domain formed by the electrodes 11a and 11b will be explained using FIG. 2. FIG. 2A is a side view of the electrodes 11a and 11b disposed in the laser chamber 10, and FIG. 2B is a cross-section view showing a cross-section 2A-2B in FIG. 2A. The pair of the electrodes 11a and 11b disposed in the laser chamber 10 may be disposed on specific positions so that a desired discharge domain 11h is formed. A gap between the electrodes 11a and 11b is defined as G.

When a width of each of the electrodes 11a and 11b is defined as W and a length thereof is defined as L, a formula for obtaining an area S of a discharge surface of each of the electrodes 11a and 11b may be S≈W×L.

Here, when a width of actual discharge does not correspond to the width W of the electrodes 11a and 11b, or when a length of actual discharge in a longer direction of the electrodes does not correspond to the length L of the electrodes 11a and 11b, the area S of the discharge surface may be calculated based on actual discharge parts of surfaces of the electrodes 11a and 11b. The area S of a discharge surface may be defined as an area obtained by measuring a consumed area of a used electrode.

When widths and lengths of a pair of electrodes are different from each other, the area S of a discharge surface may be calculated while L is set as a length of a shorter electrode and W is set as a width of a narrower electrode. The discharge domain 11h may be a space between the electrodes 11a and 11b, and a volume thereof may be appropriated by W×L×G.

2) Input Energy Ein to Electrode

Figure 3:
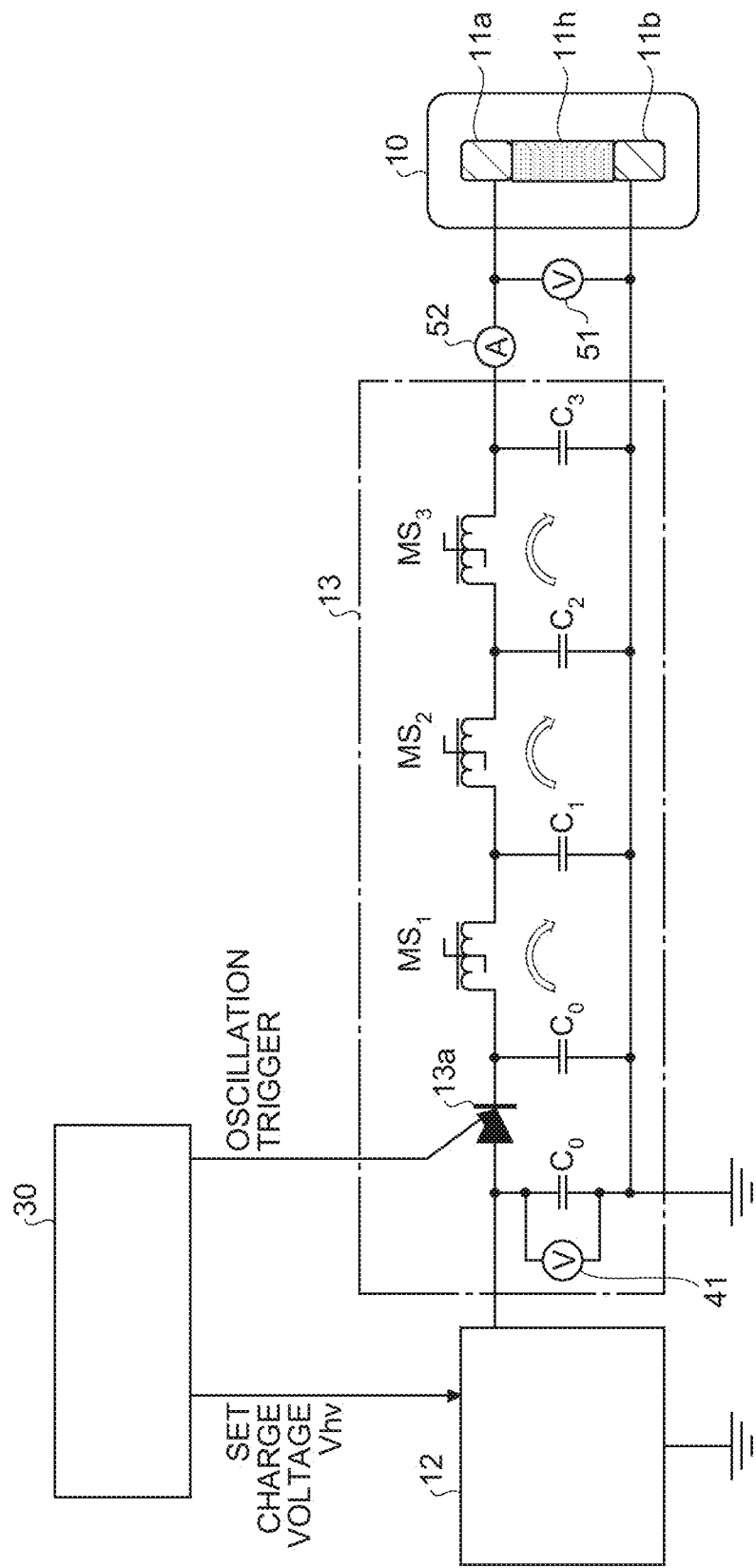
FIG. 3 is an electrical diagram of a pulse power module in the laser apparatus according to the disclosure.

Next, input energy Ein to the electrodes 11a and 11b will be explained. FIG. 3 shows an electrical diagram of the charger 12, the PPM 13, and so forth.

The PPM 13 may include a semiconductor switch being the switch 13a, magnetic switches $MS_1$, $MS_2$ and $MS_3$, and capacitors $C_0$, $C_1$, $C_2$, $C_3$ and $C_4$. When a temporal integration value of a voltage applied to a magnetic switch becomes a threshold, a current will easily flow through the switch. In the following, a state where a current easily flows through the switch will be described as a state where the switch is closed. The threshold is different by each magnetic switch.

The switch 13a may be connected to a line connecting the capacitors $C_0$ and $C_1$. The magnetic switch $MS_1$ may be located between the capacitors $C_1$ and $C_2$. The magnetic switch $MS_2$ may be located between the capacitors $C_2$ and $C_3$. The magnetic switch $MS_3$ may be located between the capacitors $C_3$ and $C_4$.

If needed, a voltage indicator 41 connected to electrodes of the capacitor $C_0$ may be installed. The voltage indicator 41 may measure a voltage applied to the capacitor $C_0$. Furthermore, a voltage indicator 51 connected to the electrodes 11a and 11b and a current indicator 52 on a circuit between one electrode $C_4$ and the electrode 11a may be installed as necessary. The current indicator 52 may be a current probe, for instance. The voltage indicator 51 may measure a voltage between the electrodes 11a and 11b. The current indicator 52 may measure a current flowing at the time of discharge between the electrodes 11a and 11b.

The controller 30 sets an order value of the voltage Vhv for charging the capacitor $C_0$ to the charger 12. Based on the order value, the charger 12 may store an electrical charge in the capacitor $C_0$ so that a voltage to be applied to the capacitor $C_0$ becomes Vhv.

Then, when a signal is transmitted to the switch 13a from the controller 30, the switch 13a may close, a current I1 may flow from the capacitor $C_0$ to the capacitor $C_1$, and thereby, the capacitor $C_1$ may be charged.

Then, the magnetic switch $MS_1$ may close, a current I2 may flow from the capacitor $C_1$ to the capacitor $C_2$, and thereby, the capacitor $C_2$ may be charged. At this time, a pulse width of the current I2 may be shorter than a pulse width of the current I1, and the capacitor $C_2$ may be charged.

Then, the switch $MS_2$ may close, a current I3 may flow from the capacitor $C_2$ to the capacitor $C_3$, and thereby, the capacitor $C_3$ may be charged. At this time, a pulse width of the current I3 may be shorter than a pulse width of the current I2, and the capacitor $C_3$ may be charged.

Then, the magnetic switch $MS_3$ may close, a current I4 may flow from the capacitor $C_3$ to the capacitor $C_4$, and thereby, the capacitor $C_4$ may be charged. At this time, a pulse width of the current I4 may be shorter than a pulse width of the current I3, and the capacitor $C_3$ may be charged.

In this way, by causing the current to flow sequentially from the capacitor $C_1$ to the capacitor $C_2$, from the capacitor $C_2$ to the capacitor $_3C$, and from the capacitor $C_3$ to the capacitor $C_4$, the pulse widths may be shortened, and the capacitor $C_4$ may be charged.

After that, a voltage may be applied between the electrodes 11a and 11b which are disposed in the laser chamber 10 from the capacitor $C_4$, and a discharge may occur in the laser gas between the electrodes 11a and 11b.

The energy inputted to the electrodes 11a and 11b may be calculated based on the voltage Vhv applied to the capacitor $C_0$ and a capacitance $C_{0c}$ of the capacitor $C_0$. That is, the input energy Ein to the electrodes may be represented by the following formula (1). Here, k is a coefficient indicating a charge loss of the electrical circuit shown in FIG. 3.

$$\text{Ein} = k \times C_{0C} \times (Vhv)^2 / 2 \quad (1)$$

3) Consumption Rate Coefficient α for Each Electrode Material

Next, a consumption rate coefficient α for each electrode material will be explained. A consumption amount of the electrodes 11a and 11b depends on materials constructing the electrodes 11a and 11b. Therefore, it is acceptable that the consumption rate coefficient α of materials constructing the electrodes 11a and 11b is previously measured in order to predict a lifetime of the electrodes 11a and 11b using the measured coefficient α.

2.2 Relationship Between Electrode Life and Input Energy

Figure 4:
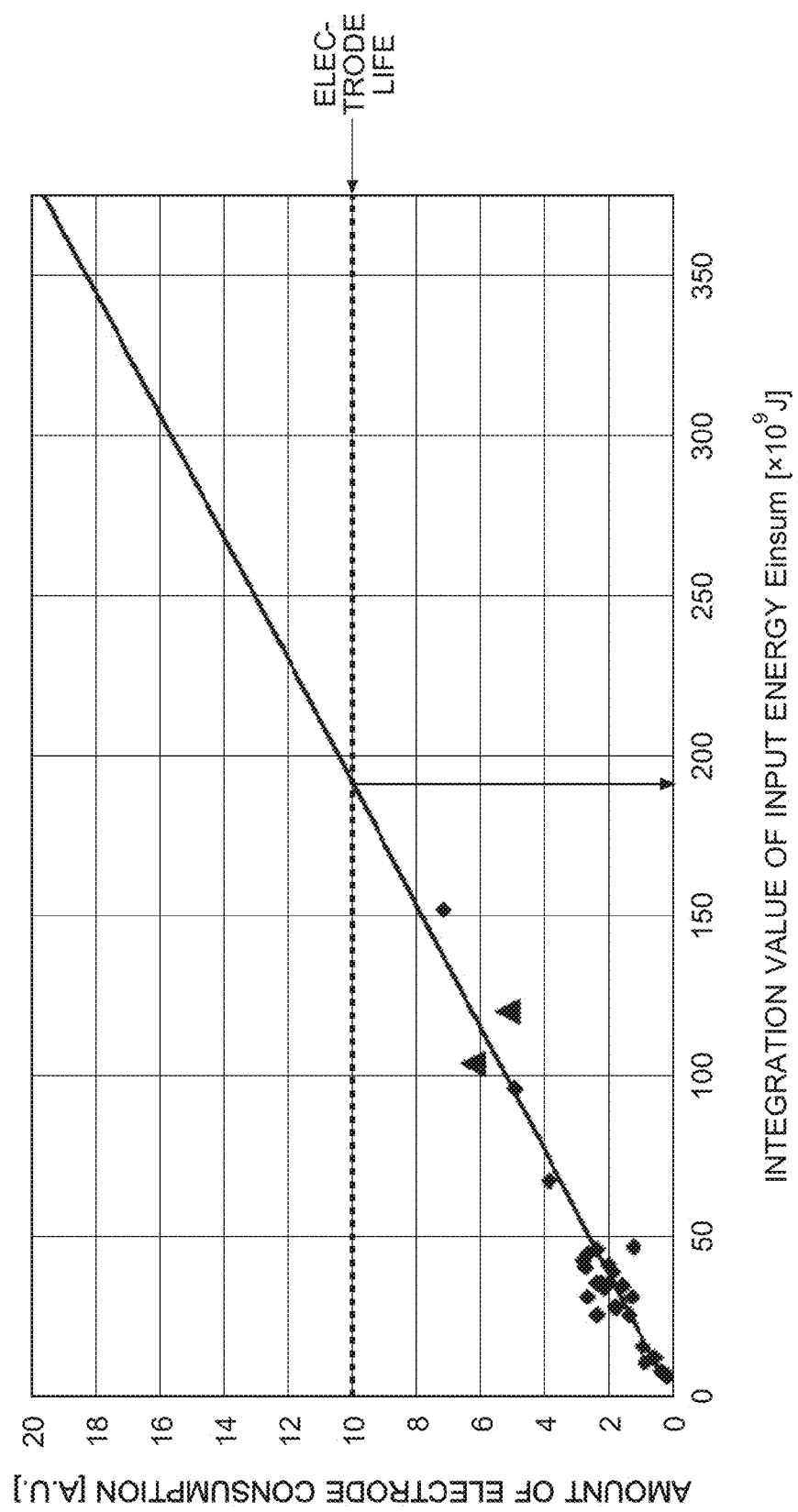
FIG. 4 is a correlation diagram between an integration value Einsum of input energy and an electrode consumption amount Rd.

FIG. 4 shows a measurement result of a relationship between an electrode consumption amount Rd of the electrodes 11a and 11b and an integration value Einsum of input energy to the electrodes 11a and 11b. From the result shown in FIG. 4, the relationship between the electrode consumption amount Rd of the electrodes 11a and 11b and the integration value Einsum of input energy to the electrodes 11a and 11b is an approximately proportional relationship.

Here, it is defined that when the electrode consumption amount Rd shown in FIG. 4 becomes 10, a desired laser performance (e.g. desired output pulse energy) cannot be maintained. According to such definition, it is possible to predict that the electrodes 11a and 11b reach the end of their lifetime when the integration value Einsum of input energy reaches $190 \times 10^9$ J in a course of repetition of pulse laser oscillations. That is, in such case, an integration lifetime value Einsumlife of input energy being an electrode life is $190 \times 10^9$ J.

As described above, the electrode life of the electrodes 11a and 11b can be determined based on the integration value of input energy to the electrodes 11a and 11b.

Energy $Ein_i$ to be applied to the electrodes 11a and 11b at an i-th pulse oscillation can be calculated by the following formula (2) using a charge voltage $Vhv_i$ and the capacitance $C_{OC}$ of the capacitor $C_O$ installed in the PPM 13 based on the above-described formula (1).

$$Ein_i = k \times C_{OC} \times (Vhv_i)^2 / 2 \qquad (2)$$

Accordingly, when the number of pulse laser oscillation is n, the integration value Einsum of input energy is represented by the following formula (3).

$$Einsum = \Sigma Ein_i = Ein_1 + Ein_2 + \ldots + Ein_n = k \times (C_{OC}/2) \Sigma (Vhv_i)^2 \qquad (3)$$

The consumption rate coefficient α of the electrodes 11a and 11b can be obtained from a gradient of the electrode consumption amount Rd with respect to the integration value Einsum of input energy based on the graph shown in FIG. 4. When a value of the coefficient α is defined, the electrode consumption amount Rd may be calculated by the following formula (4).

$$Rd = \alpha \times Einsum = k \times \alpha (C_{OC}/2) \Sigma (Vhv_i)^2 \qquad (4)$$

Accordingly, the lifetime of the electrodes 11a and 11b can be predicted based on the integration value Einsum of input energy to the electrodes 11a and 11b.

When the electrode consumption amount of the electrodes 11a and 11b at the time when the laser performance (e.g. output pulse energy) becomes difficult to be maintained is defined as Rdlife, a relationship between the electrode consumption amount Rdlife and the integration lifetime value Einsumlife of input energy is represented by the following formula (5).

$$Einsumlife = Rdlife / \alpha \qquad (5)$$

From the formula (5), the integration lifetime value Einsumlife of input energy can be calculated from the electrode consumption amount Rdlife, the area S of the discharge surface in the electrodes 11a and 11b, and the consumption rate coefficient α of the electrodes 11a and 11b.

In determining whether the electrodes 11a and 11b reach the end of their lifetime, it is possible to determine that the electrodes 11a and 11b reach the end of their lifetime when the following formula (6) comes into effect. When it is determined that the electrodes 11a and 11b have reached the end of their lifetime, the controller 30 may notify an external device or display a message for notifying that the laser chamber 10 has reached the end of its lifetime on an operation panel of the laser apparatus.

$$Einsumlife < Einsum \qquad (6)$$

In order to detect that the electrodes 11a and 11b are near the end of their lifetime, it is possible to determine the electrodes 11a and 11b are near the end of their lifetime when the following formula (7) comes into effect. When it is determined that the electrodes are near the end of their lifetime, the controller 30 may notify an external device or display a message for notifying that the laser chamber 10 is near the end of its lifetime on an operation panel of the laser apparatus. Here, β may be within a range of $0.8 \leq \beta < 1$.

$$\beta \times Einsumlife < Einsum \qquad (7)$$

In the above description, a case where a value set up in the charger 12 is used as the charge voltage $Vhv_i$ is explained. However, it is also possible to calculate the integration value Einsum of input energy based on a voltage value of the capacitor $C_O$ measured by the voltage indicator 41 shown in FIG. 3. The integration value Einsum of input energy can also be calculated based on a voltage value and a current value to be inputted to the electrodes 11a and 11b measured by the voltage indicator 51 and the current indicator 52 shown in FIG. 3.

2.3 First Prediction Method of Electrode Line

Figure 5:
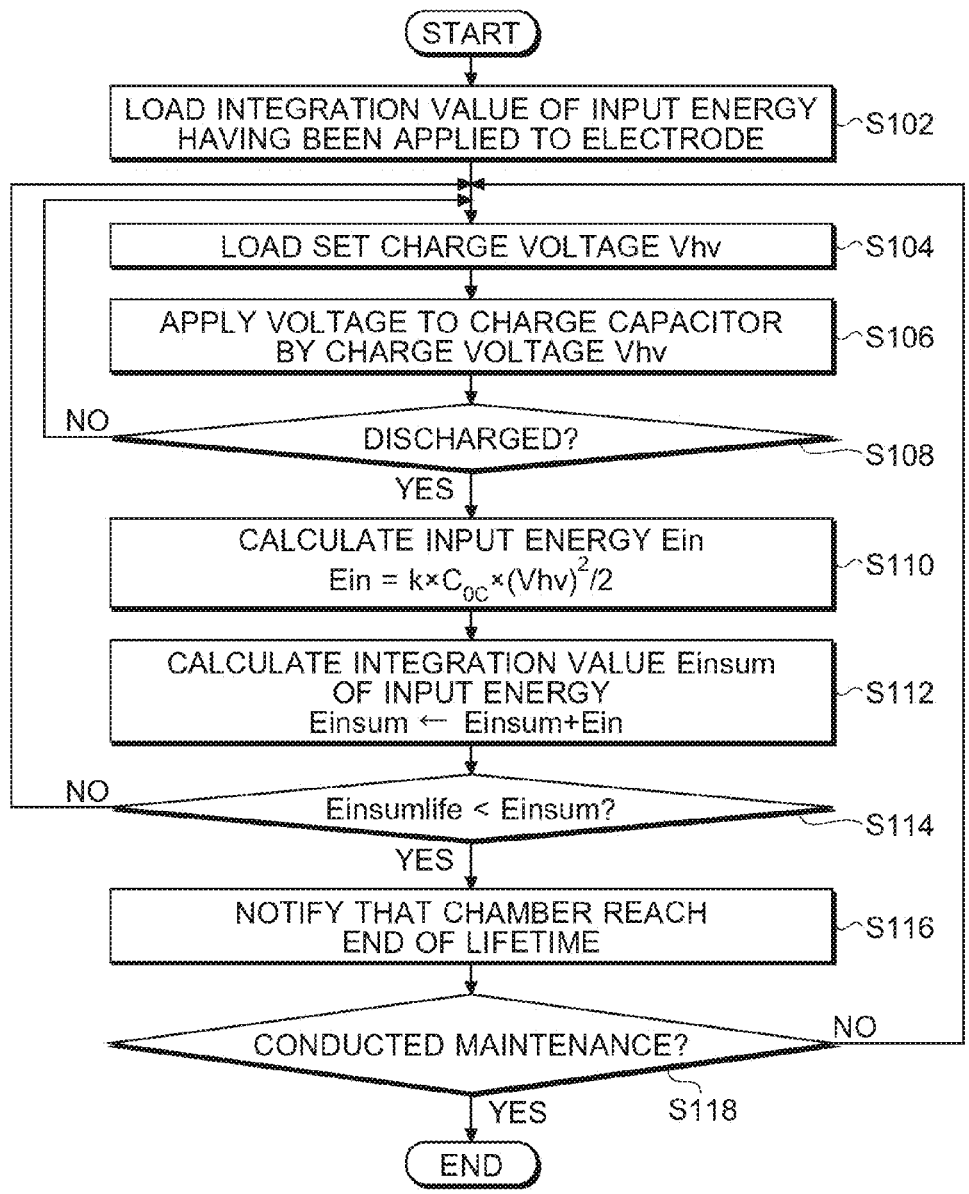
FIG. 5 is a flowchart showing a first control method of the laser apparatus according to the disclosure.

Using FIG. 5, a method of controlling a laser apparatus, especially a method of predicting an electrode lifetime, will be explained.

Firstly, in step S102, the controller 30 may load an integration value of energy having been applied to the electrodes 11a and 11b, and define the loaded integration value of input energy as Einsum. The integration value of energy having been applied to the electrodes 11a and 11b may be an integration value of energy applied to the electrodes 11a and 11b until the laser chamber 10 is installed in the laser apparatus. In particular, there is a case where the electrodes 11a and 11b have been used for discharge in a different laser apparatus. When the electrodes 11a and 11b have not been used for discharge, the integration value Einsum of input energy may be defined as 0.

Then, in step S104, the controller 30 may load a charge voltage Vhv set up in the charger 12.

Then, in step S106, the controller 30 may apply the voltage Vhv to the capacitor $C_O$ using the charger 12.

Then, in step S108, the controller 30 may determine whether a discharge occurred between the electrodes 11a and 11b in the laser chamber 10 or not. When the controller 30 determines as that a discharge occurred, the controller 30 may progress to step S110. On the other hand, when the controller 30 determines as that a discharge did not occurred, the controller 30 may progress to step S104. The determination whether a discharge occurred may be conducted as the following. For example, it may be determined based on whether a trigger signal is transmitted to the switch 13a or not. Alternatively, it may be determined based on whether a laser beam is detected by the energy monitor unit 17 or not.

Then, in step S110, the controller 30 may calculate an input energy Ein. Specifically, the controller 30 may calculate the input energy Ein based on the formula (1). Here, k is a coefficient.

$$Ein = k \times C_{OC} \times (Vhv)^2 / 2 \qquad (1)$$

Then, in step S112, the controller 30 may calculate a new integration value Einsum of input energy by adding the input energy Ein calculated in step S110 to the current integration value Einsum of input energy.

Then, in step S114, the controller 30 may determine whether the integration value Einsum of input energy exceeds an integration lifetime value Einsumlife of input energy or not. When the controller 30 determines as that the integration value Einsum of input energy exceeds the integration lifetime value Einsumlife of input energy, the controller 30 may progress to step S116. On the other hand, when the controller 30 determines as that the integration value Einsum of input energy does not exceed the integration lifetime value Einsumlife of input energy, the controller 30 may progress to step S104.

Then, in step S116, the controller 30 may notify an external device that the laser chamber 10 reaches the end of its lifetime because the electrodes 11a and 11b reach the end of their lifetime. The controller 30 may display a message for notifying that the laser chamber 10 reaches the end of its lifetime on an operation panel, or the like, instead of the notification to the external device.

Then, in step S118, the controller 30 may determine whether maintenance such as a chamber exchange, or the like, was conducted or not. When the controller 30 determined that maintenance was conducted, the controller 30 may finish this flow of the method of predicting an electrode lifetime. On the other hand, when the controller 30 determined that maintenance was not conducted, the controller 30 may progress to step S104. When the maintenance is a chamber exchange, the controller 30 may confirm a serial number of the laser chamber 10, and determine whether the chamber exchange was conducted or not based on whether the serial number is different or not. When the maintenance is an adjustment of a gap G between the electrodes 11a and 11b, the controller 30 may detect positions of the electrodes 11a and 11b, and determine based on whether the positions are varied or not. When the maintenance is an exchange of the electrodes 11a and 11b, the controller 30 may confirm serial numbers of the electrodes 11a and 11b, and determine based on whether the exchange of the electrodes 11a and 11b is conducted or not.

Another calculation method of input energy Ein will be explained. The input energy Ein may be calculated based on a voltage value of the capacitor $C_0$ measured by the voltage indicator 41. In such case, a measurement of a voltage of the capacitor $C_0$ by the voltage indicator 41 may be additionally executed in step S108, or the like. The input energy Ein may be calculated by replacing the charge voltage Vhv with a voltage measured by the voltage indicator 41 multiplied by a specific coefficient, if necessary.

The input energy Ein may be calculated based on a voltage and a current measured by the voltage indicator 51 and the current indicator 52. In such case, a measurement of a voltage and a current by the voltage indicator 51 and the current indicator 52 may be additionally executed in step S108, or the like. The input energy Ein may be calculated by multiplying a product of the voltage measured by the voltage indicator 51 and the current measured by the current indicator 52 by a specific coefficient, if necessary.

2.4 Second Prediction Method of Electrode Line

Next, another method of predicting an electrode lifetime will be explained. A method of predicting an electrode lifetime shown in FIG. 6 may determine based on a relationship between the input energy Ein and the shot number Blife being the lifetime of the electrodes.

Figure 6:
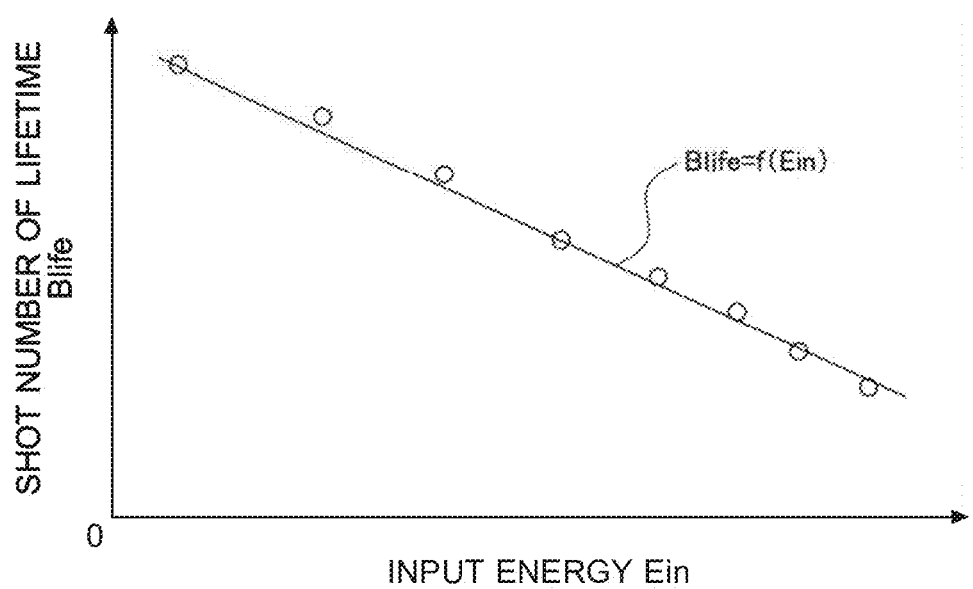
FIG. 6 is a correlation diagram between an input energy Ein and an end shot number Blife.

Specifically, the relationship between the input energy Ein shown in FIG. 6 and the shot number Blife at which the electrodes reach the lifetime may be previously measured by testing. An approximate function of an end shot number Blife=f(Ein) obtained thereby may be stored in the storage 31 of the controller 30. A lifetime with change of the input energy Ein may be predicted using the end shot number Blife=f(Ein).

When a lifetime index value Lf calculated using the following formula (8) is greater than 1, the controller 30 may determine that the electrodes 11a and 11b reach the end of their lifetime.

$$Lf = \Sigma 1/f(Ein_i) \tag{8}$$

When the lifetime index value Lf becomes greater than 1, the controller 30 may notify an external device or display a message for notifying that the electrodes reach the end of their lifetime on an operation panel of the laser apparatus. When the lifetime index value Lf is within a range of $0.8 \leq Lf \leq 1$, the controller 30 may notify an external device or display a message for notifying that the electrodes are near the end of their lifetime on an operation panel of the laser apparatus.

Figure 7:
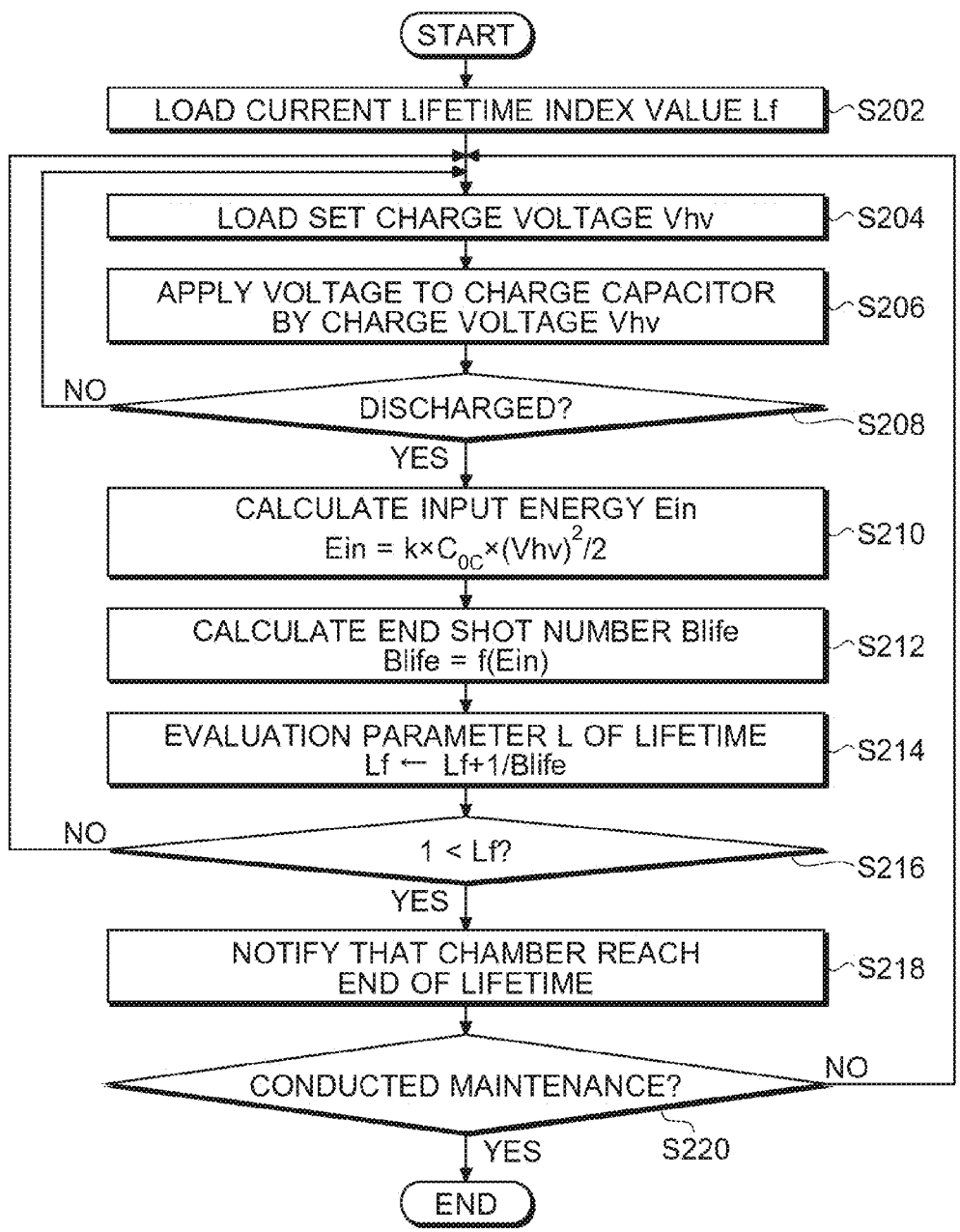
FIG. 7 is a flowchart showing a second control method of the laser apparatus according to the disclosure.
Figure 8:
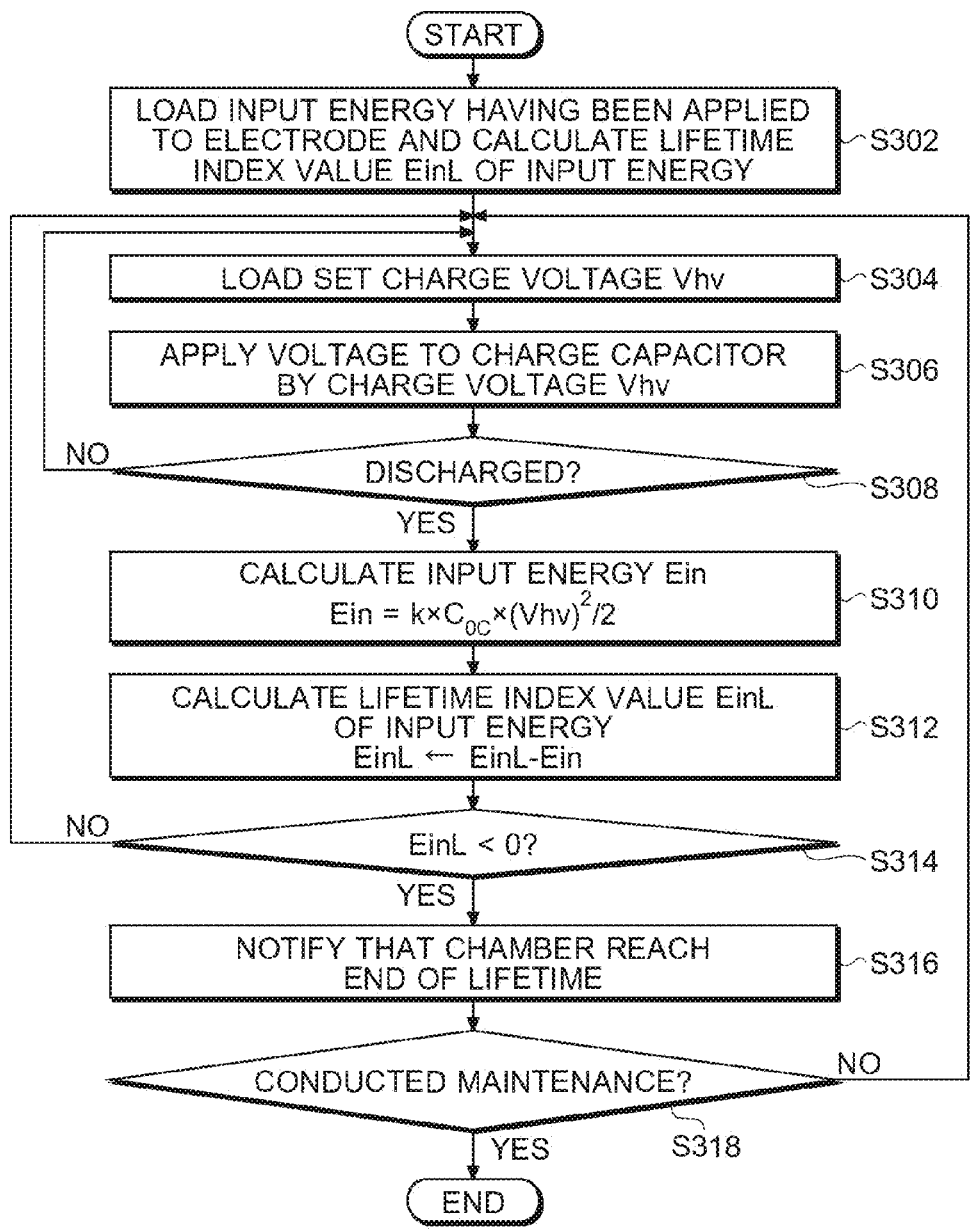
FIG. 8 is a flowchart showing a third control method of the laser apparatus according to the disclosure.

A method of predicting the electrode lifetime will be explained using FIG. 7.

Firstly, in step S202, the controller 30 may load a current lifetime index value Lf. The current lifetime index value may be a lifetime index value at the time when the laser chamber 10 is installed in the laser apparatus. In particular, there is a case where the electrodes 11a and 11b have been used for discharge in a different laser apparatus. When the electrodes 11a and 11b have not been used for discharge, the lifetime index value Lf may be defined as 0.

Then, in step S204, the controller 30 may load a charge voltage Vhv set up in the charger 12.

Then, in step S206, the controller 30 may apply a voltage to the capacitor $C_0$ using the charger 12 so that the applied voltage becomes the charge voltage Vhv.

Then, in step S208, the controller 30 may determine whether a discharge occurs between the electrodes 11a and 11b in the laser chamber 10. When the controller 30 determines as that a discharge occurred, the controller 30 may progress to step S210. On the other hand, when the controller 30 determines as that a discharge did not occurred, the controller 30 may progress to step S204. The determination whether a discharge occurred may be conducted as the following. For example, it may be determined based on whether a trigger signal is transmitted to the switch 13a or not. Alternatively, it may be determined based on whether a laser beam is detected by the energy monitor unit 17 or not.

Then, in step S210, the controller 30 may calculate an input energy Ein. Specifically, the controller 30 may calculate the input energy Ein based on the above-described formula (1).

Then, in step S212, the controller 30 may calculate the end shot number Blife based on the input energy Ein calculated in step S210 using the approximate formula of Blife=f(Ein).

Then, in step S214, the controller 30 may calculate a new lifetime index value Lf by adding an inverse of the lifetime shot number Blife calculated in step S212 to the current lifetime index Lf value Einsum of input energy.

Then, in step S216, the controller 30 may determine whether the lifetime index value Lf exceeds 1 or not. When the controller 30 determines as that the lifetime index value Lf exceeds 1, the controller 30 may progress to step S218. On the other hand, when the controller 30 determines as that the lifetime index value Lf does not exceed 1, the controller 30 may progress to step S204.

Then, in step S218, the controller 30 may notify an external device that the laser chamber 10 reaches the end of its lifetime because the electrodes 11a and 11b reach the end of their lifetime. The controller 30 may display a message for notifying that the laser chamber 10 reaches the end of its lifetime on an operation panel, or the like, instead of the notification to the external device.

Then, in step S220, the controller 30 may determine whether maintenance such as a chamber exchange, or the like, was conducted or not. When the controller 30 determined that maintenance was conducted, the controller 30 may finish this flow of the method of predicting an electrode lifetime. On the other hand, when the controller 30 determined that maintenance was not conducted, the controller 30 may progress to step S204. When the maintenance is a chamber exchange, the controller 30 may confirm a serial number of the laser chamber 10, and determine whether the chamber exchange was conducted or not based on whether the serial number is different or not. When the maintenance is an adjustment of a gap G between the electrodes 11a and 11b, the controller 30 may detect positions of the electrodes 11a and 11b, and determine based on whether the positions are varied or not. When the maintenance is an exchange of the electrodes 11a and 11b, the controller 30 may confirm serial numbers of the electrodes 11a and 11b, and determine based on whether the exchange of the electrodes 11a and 11b is conducted or not.

A calculation of input energy Ein may executed based on a voltage value of the capacitor $C_0$ measured by the voltage indicator 41. In such case, a measurement of a voltage of the capacitor $C_0$ by the voltage indicator 41 may be additionally executed in step S208, or the like. The input energy Ein may be calculated by replacing the charge voltage Vhv with a voltage measured by the voltage indicator 41 multiplied by a specific coefficient, if necessary.

The input energy Ein may be calculated based on a voltage and a current measured by the voltage indicator 51 and the current indicator 52. In such case, a measurement of a voltage and a current by the voltage indicator 51 and the current indicator 52 may be additionally executed in step S208, or the like. The input energy Ein may be calculated by multiplying a product of the voltage measured by the voltage indicator 51 and the current measured by the current indicator 52 by a specific coefficient, if necessary.

2.5 Third Prediction Method of Electrode Line

Next, yet another method of predicting an electrode lifetime will be explained.

Firstly, in step S302, the controller 30 may load an integration value of energy having been applied to the electrodes 11a and 11b, and calculate a lifetime index value EinL of input energy. Specifically, the controller 30 may load the integration value of energy having been applied to the electrodes 11a and 11b, subtract the loaded integration value of input energy from the integration lifetime value Einsumlife of input energy, and calculate the lifetime index value EinL of input energy. The integration value of energy having been applied to the electrodes 11a and 11b may be an integration value of energy applied to the electrodes 11a and 11b until the laser chamber 10 is installed in the laser apparatus. In particular, there is a case where the electrodes 11a and 11b have been used for discharge in a different laser apparatus. When the electrodes 11a and 11b have not been used for discharge, the integration value of input energy may be defined as 0. In such case, the lifetime index value EinL of input energy may be equal to the integration lifetime value Einsumlife of input energy.

Then, in step S304, the controller 30 may load a charge voltage Vhv set up in the charger 12.

Then, in step S306, the controller 30 may apply the voltage Vhv to the capacitor $C_0$ using the charger 12.

Then, in step S308, the controller 30 may determine whether a discharge occurred between the electrodes 11a and 11b in the laser chamber 10 or not. When the controller 30 determines as that a discharge occurred, the controller 30 may progress to step S310. On the other hand, when the controller 30 determines as that a discharge did not occurred, the controller 30 may progress to step S304. The determination whether a discharge occurred may be conducted as the following. For example, it may be determined based on whether a trigger signal is transmitted to the switch 13a or not. Alternatively, it may be determined based on whether a laser beam is detected by the energy monitor unit 17 or not.

Then, in step S310, the controller 30 may calculate an input energy Ein. Specifically, the controller 30 may calculate the input energy Ein based on the above-described formula (1).

Then, in step S312, the controller 30 may calculate a new lifetime index value EinL of input energy by subtracting the input energy Ein calculated in step S310 from the current lifetime index value EinL of input energy.

Then, in step S314, the controller 30 may determine whether the lifetime index value EinL of input energy is smaller than 0 or not. When the controller 30 determines as that the lifetime index value EinL is smaller than 0, the controller 30 may progress to step S316. On the other hand, when the controller 30 determines as that the lifetime index value EinL is not smaller than 0, the controller 30 may progress to step S304.

Then, in step S316, the controller 30 may notify an external device that the laser chamber 10 reaches the end of its lifetime because the electrodes 11a and 11b reach the end of their lifetime. The controller 30 may display a message for notifying that the laser chamber 10 reaches the end of its lifetime on an operation panel, or the like, instead of the notification to the external device.

Then, in step S318, the controller 30 may determine whether maintenance such as a chamber exchange, or the like, was conducted or not. When the controller 30 determined that maintenance was conducted, the controller 30 may finish this flow of the method of predicting an electrode lifetime. On the other hand, when the controller 30 determined that maintenance was not conducted, the controller 30 may progress to step S304. When the maintenance is a chamber exchange, the controller 30 may confirm a serial number of the laser chamber 10, and determine whether the chamber exchange was conducted or not based on whether the serial number is different or not. When the maintenance is an adjustment of a gap G between the electrodes 11a and 11b, the controller 30 may detect positions of the electrodes 11a and 11b, and determine based on whether the positions are varied or not. When the maintenance is an exchange of the electrodes 11a and 11b, the controller 30 may confirm serial numbers of the electrodes 11a and 11b, and determine based on whether the exchange of the electrodes 11a and 11b is conducted or not.

A calculation of input energy Ein may be executed based on a voltage value of the capacitor $C_0$ measured by the voltage indicator 41. In such case, a measurement of a voltage of the capacitor $C_0$ by the voltage indicator 41 may be additionally executed in step S308, or the like. The input energy Ein may be calculated by replacing the charge voltage Vhv with a voltage measured by the voltage indicator 41 multiplied by a specific coefficient, if necessary.

The input energy Ein may be calculated based on a voltage and a current measured by the voltage indicator 51 and the current indicator 52. In such case, a measurement of a voltage and a current by the voltage indicator 51 and the current indicator 52 may be additionally executed in step S308, or the like. The input energy Ein may be calculated by multiplying a product of the voltage measured by the voltage indicator 51 and the current measured by the current indicator 52 by a specific coefficient, if necessary.

2.6 Fourth Prediction Method of Electrode Line

Next, yet another method of predicting an electrode lifetime will be explained.

In a case where an electrode lifetime is predicted, pulse energy E of a pulse laser beam may be monitored, and an integration value Einsum of input energy may be approximated from input energy Ein corresponding to a value of pulse energy E.

For example, as shown in FIG. 9, when pulse energy E of a pulse laser beam is smaller than 10 mJ, input energy Ein may be defined as Eina (J). When pulse energy E of a pulse laser beam is equal to or greater than 10 mJ and is smaller than 11.25 mJ, input energy Ein may be defined as Einb (J). When pulse energy E of a pulse laser beam is equal to or greater than 11.25 mJ and is smaller than 13.75 mJ, input energy Ein may be defined as Einc (J). When pulse energy E of a pulse laser beam is equal to or greater than 13.75 mJ and is smaller than 15 mJ, input energy Ein may be defined as Eind (J). When pulse energy E of a pulse laser beam is equal to or greater than 15 mJ, input energy Ein may be defined as Eine (J).

From the input energy Ein obtained as above, based on the following formula (9), the integration value Einsum of input energy may be approximated.

$$Einsum \approx na \times Eina + nb \times Einb + nc \times Einc + nd \times Eind + ne \times Eine \quad (9)$$

Here, na is the shot number of pulse laser beams of which pulse energy E is smaller than 10 mJ, nb is the shot number of pulse laser beams of which pulse energy E is equal to or greater than 10 mJ and is smaller than 11.25 mJ, nc is the shot number of pulse laser beams of which pulse energy E is equal to or greater than 11.25 mJ and is smaller than 13.75 mJ, nd is the shot number of pulse laser beams of which pulse energy E is equal to or greater than 13.75 mJ and is smaller than 15 mJ, ne is the shot number of pulse laser beams of which pulse energy E is equal to or greater than 15 mJ.

Next, such method of predicting an electrode lifetime will be explained using FIG. 10.

Firstly, in step S332, the controller 30 may load an integration value of energy having been applied to the electrodes 11a and 11b, and define the loaded integration value of input energy as Einsum. The integration value of energy having been applied to the electrodes 11a and 11b may be an integration value of energy applied to the electrodes 11a and 11b until the laser chamber 10 is installed in the laser apparatus. In particular, there is a case where the electrodes 11a and 11b have been used for discharge in a different laser apparatus. When the electrodes 11a and 11b have not been used for discharge, the integration value Einsum of input energy may be defined as 0.

Then, in step S104, the controller 30 may determine whether laser oscillations occur or not. In particular, the controller 30 may determine whether laser oscillations occur or not based on whether the optical sensor 17c in the energy monitor unit 17 detects a pulse laser beam or not. When the controller 30 determines as that laser oscillations occur, the controller 30 may progress to step S336. On the other hand, when the controller 30 determines as that laser oscillations do not occur, the controller 30 may repeat step S334.

Then, in step S336, the optical sensor 17c of the energy monitor unit 17 may measure pulse energy E of a pulse laser beam.

Then, in step S338, the controller 30 may execute a sub-routine for specifying the following range of pulse energy. In this way, input energy Ein corresponding to the pulse energy E of the pulse laser beam measured in step S336 may be obtained.

Then, in step S340, the controller 30 may calculate a new integration value Einsum of input energy by adding the input energy Ein calculated in step S338 to the current integration value Einsum of input energy.

Then, in step S342, the controller 30 may determine whether the integration value Einsum of input energy exceeds an integration lifetime value Einsumlife of input energy or not. When the controller 30 determines as that the integration value Einsum of input energy exceeds the integration lifetime value Einsumlife of input energy, the controller 30 may progress to step S344. On the other hand, when the controller 30 determines as that the integration value Einsum of input energy does not exceed the integration lifetime value Einsumlife of input energy, the controller 30 may progress to step S334.

Then, in step S344, the controller may notify an external device that the laser chamber 10 reaches the end of its lifetime because the electrodes 11a and 11b reach the end of their lifetime. The controller 30 may display a message for notifying that the laser chamber 10 reaches the end of its lifetime on an operation panel, or the like, instead of the notification to the external device.

Then, in step S346, the controller 30 may determine whether maintenance such as a chamber exchange, or the like, was conducted or not. When the controller 30 determined that maintenance was conducted, the controller 30 may finish this flow of the method of predicting an electrode lifetime. On the other hand, when the controller 30 determined that maintenance was not conducted, the controller 30 may progress to step S334. When the maintenance is a chamber exchange, the controller 30 may confirm a serial number of the laser chamber 10, and determine whether the chamber exchange was conducted or not based on whether the serial number is different or not. When the maintenance is an adjustment of a gap G between the electrodes 11a and 11b, the controller 30 may detect positions of the electrodes 11a and 11b, and determine based on whether the positions are varied or not. When the maintenance is an exchange of the electrodes 11a and 11b, the controller 30 may confirm serial numbers of the electrodes 11a and 11b, and determine based on whether the exchange of the electrodes 11a and 11b is conducted or not.

Next, using FIG. 11, the sub-routine for specifying the range of pulse energy in step S338 shown in FIG. 10 will be explained. The sub-routine may be executed on the controller 30, and it may be a sub-routine to obtain the input energy Ein corresponding to the pulse energy E of a pulse laser beam measured in step S336.

Firstly, in step S352, the controller 30 may determine whether a value of measured pulse energy E of a pulse laser beam is smaller than 10 mJ or not. When the value of the measured pulse energy E of the pulse laser beam is smaller than 10 mJ, the controller 30 may progress to step S354. When the value of the measured pulse energy E of the pulse laser beam is not smaller than 10 mJ, the controller 30 may progress to step S356.

Figure 10:
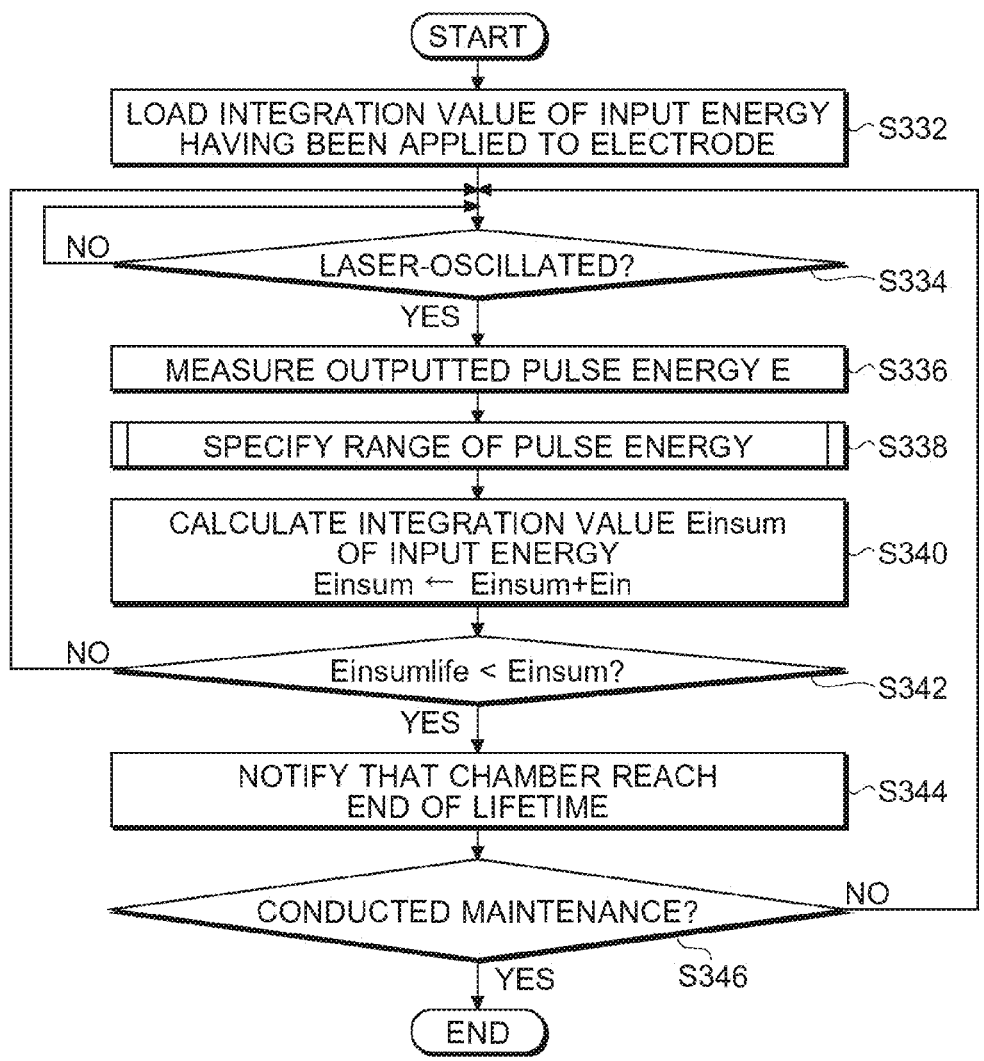
FIG. 10 is a flowchart showing the fourth control method of the laser apparatus according to the disclosure.
Figure 11:
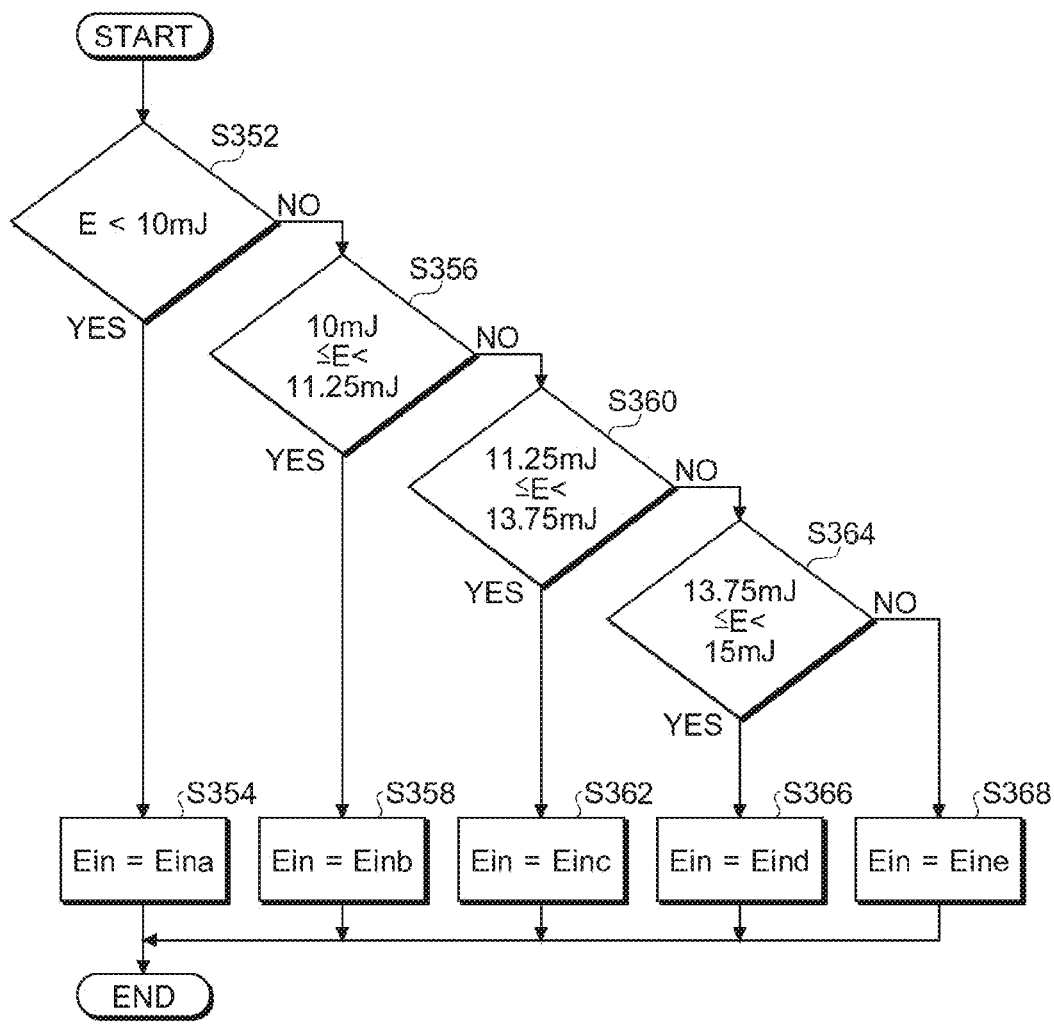
FIG. 11 is a flowchart showing a sub-routine in the fourth control method of the laser apparatus according to the disclosure.

Then, in step S354, the controller 30 may set input energy Ein as Eina, and then the controller 30 may return to the main routine shown in FIG. 10.

Then, in step S356, the controller 30 may determine whether the value of the measured pulse energy E of the pulse laser beam is equal to or greater than 10 mJ and is smaller than 11.25 mJ or not. When the value of the measured pulse energy E of the pulse laser beam is within the range of equal to or greater than 10 mJ and smaller than 11.25 mJ, the controller 30 may progress to step S358. When the value of the measured pulse energy E of the pulse laser beam is not within the range of equal to or greater than 10 mJ and smaller than 11.25 mJ, the controller 30 may progress to step S360.

Then, in step S358, the controller 30 may set input energy Ein as Einb, and then the controller 30 may return to the main routine shown in FIG. 10.

Then, in step S360, the controller 30 may determine whether the value of the measured pulse energy E of the pulse laser beam is equal to or greater than 11.25 mJ and is smaller than 13.75 mJ or not. When the value of the measured pulse energy E of the pulse laser beam is within the range of equal to or greater than 11.25 mJ and smaller than 13.75 mJ, the controller 30 may progress to step S362.

When the value of the measured pulse energy E of the pulse laser beam is not within the range of equal to or greater than 11.25 mJ and smaller than 13.75 mJ, the controller 30 may progress to step S364.

Then, in step S362, the controller 30 may set input energy Ein as Einc, and then the controller 30 may return to the main routine shown in FIG. 10.

Then, in step S364, the controller 30 may determine whether the value of the measured pulse energy E of the pulse laser beam is equal to or greater than 13.75 mJ and is smaller than 15 mJ or not. When the value of the measured pulse energy E of the pulse laser beam is within the range of equal to or greater than 13.75 mJ and smaller than 15 mJ, the controller 30 may progress to step S366. When the value of the measured pulse energy E of the pulse laser beam is not within the range of equal to or greater than 13.75 mJ and smaller than 15 mJ, the controller 30 may progress to step S368.

Then, in step S366, the controller 30 may set input energy Ein as Eind, and then the controller 30 may return to the main routine shown in FIG. 10.

Then, in step S368, the controller 30 may set input energy Ein as Eine, and then the controller 30 may return to the main routine shown in FIG. 10.

Figure 12:
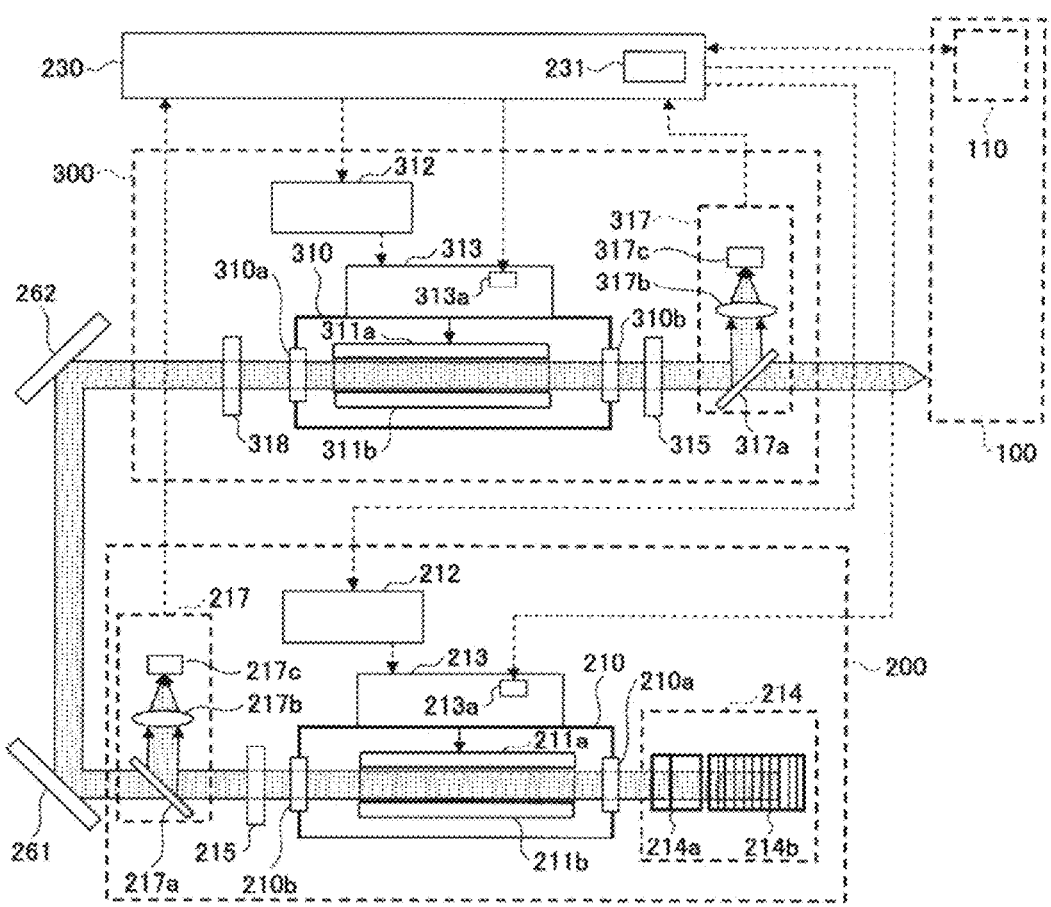
FIG. 12 is a structure diagram of a double chamber laser apparatus according to the disclosure.

3. Life Prediction Method of Double Chamber Excimer Laser Apparatus 3.1 Structure A double chamber excimer laser apparatus will be explained. As shown in FIG. 12, a double chamber excimer laser apparatus may include an MO 200, a PO 300, a controller 230, and HR mirrors 261 and 262. The MO and the PO may be abbreviations of master oscillator and power oscillator, respectively.

The MO 200 may have the same structure as that of the laser apparatus shown in FIG. 1. Specifically, the MO 200 may include an MO laser chamber 210, an MO charger 212, an MO PPM 213, a laser resonator, an MO energy monitor unit 217.

The MO laser chamber 210 may include a pair of electrodes 211a and 211b, and two windows 210a and 210b through which a laser beam passes.

The laser resonator may include an LNM 214 and an MO OC 215. The MO laser chamber 210 may be located on a light path of the laser resonator.

The LNM 14 may include a prism 214a and a grating 214b. The prism 214a may expand a width of beams. The grating 214b may be arranged by a Littrow arrangement, and the laser apparatus may oscillate with a target wavelength.

The MO OC 215 may be a partial reflection mirror which reflects a part of a laser beam and through which a part of the laser beam passes.

The MO energy monitor unit 217 may include a beam splitter 217a, a collector lens 217b and an optical sensor 217c; the beam splitter 217a being disposed on a light path of laser beams outputted from the MO OC 215.

The MO PPM 213 may include a capacitor (not shown in FIG. 12), and be connected to the electrodes 211a and 211b, and it may further include a switch 213a. By inputting a trigger signal to the switch 213a, a discharge may occur between the electrodes 211a and 211b. The MO charger 212 may be connected to the capacitor installed in the MO PPM 213.

The PO 300 may include a PO laser chamber 310, a PO charger 312, a PO PPM 313, a laser resonator and a PO energy monitor unit 317.

The PO laser chamber 310 may include a pair of electrodes 311a and 311b, and two windows 310a and 310b through which a laser beam passes.

The laser resonator may include a partial reflector mirror 318 and a PO OC 315. The PO laser chamber 310 may be located on a light path of the laser resonator.

The PO OC 315 may be a partial reflection mirror which reflects a part of a laser beam and through which a part of the laser beam passes.

The PO energy monitor unit 317 may include a beam splitter 317a, a collector lens 317b and an optical sensor 317c; the beam splitter 217a being disposed on a light path of laser beams outputted from the PO OC 315.

The PO PPM 313 may include a capacitor (not shown in FIG. 12), and be connected to the electrodes 311a and 311b, and it may further include a switch 313a. By inputting a trigger signal to the switch 313a, a discharge may occur between the electrodes 311a and 311b. The PO charger 312 may be connected to the capacitor installed in the PO PPM 313.

3.2 Operation

The controller 230 may receive signals about a target pulse energy Et and oscillation triggers which are transmitted from an exposure apparatus controller 110 installed in an exposure apparatus 100.

The controller 230 may set, based on the received signals of the target pulse energy Et and the oscillation triggers, a specific charge voltage (Vhvmo) to the MO charger 212 and a specific charge voltage (Vhvpo) to the PO charger 312 so that pulse energy of laser beams outputted from the PO 300 becomes the target pulse energy Et.

The controller 230 may apply a voltage between the electrodes 211a and 211b by operating the switch 213a disposed in the MO PPM 213 after elapsing a specific period of time from inputting of each of the oscillation triggers. The controller 230 may apply a voltage between the electrodes 311a and 311b by operating the switch 313a disposed in the PO PPM 313 after elapsing a specific period of time from the operation of the switch 213a.

Discharge may occur between the electrodes 211a and 211b of the MO laser chamber 210 at the time when the switch 213a of the MO PPM 213 receives the trigger signal transmitted from the controller 230.

When discharge occurs between the electrodes 211a and 211b of the MO laser chamber 210, the laser gas may be excited, and light may be generated from the excited laser gas. The light may resonate between the MO OC 215 and the LNM 214, and a laser oscillation may occur. A laser beam line-narrowed by the prism 214a and the grating 214b may be outputted through the MO OC 215. A part of the outputted laser beam may be reflected by the beam splitter 217a, pulse energy Emo thereof may be measured by the MO energy monitor unit 217, and a measured value of the pulse energy Emo may be transmitted to the controller 230.

A laser beam (seed laser beam) outputted from the MO 200 and passing through the beam splitter 217a may be reflected by the HR mirrors 261 and 262, and enter the partial reflector mirror 318 installed in the PO 300.

The partial reflector mirror 318 may transmit a part of the laser beam entered thereto, and the transmitted laser beam may enter a space between the electrodes 311a and 311b of the PO laser chamber 310. At the time when the transmitted laser beam exists in the space between the electrodes 311a and 311b of the PO laser chamber 310, the laser gas in the PO laser chamber 310 may be excited by discharging between the electrodes 311a and 311b.

Thereby, the laser beam entered into the PO 300 may be amplified, and the amplified laser beam may be outputted through the PO OC 315. A part of the laser beam outputted through the PO OC 315 may be reflected by the beam splitter 317a, pulse energy Epo thereof may be measured by the PO energy monitor unit 317, and a measured value of the pulse energy Epo may be transmitted to the controller 230.

In a control of the charge voltage Vhvmo in the MO 200, based on the value of the pulse energy Emo, the controller 230 may execute a feedback control so that next output pulse energy Emo of the MO 200 comes close to a specific pulse energy Emot.

In a control of the charge voltage Vhvpo in the PO 300, based on the value of the pulse energy Epo, the controller 230 may execute a feedback control so that next output pulse energy Epo of the PO 300 comes close to a target pulse energy Et.

The controller 230 may determine an electrode lifetime of the electrodes 211a and 211b of the MO laser chamber 210 in the MO 200 based on the charge voltage Vhvmo and the pulse energy Emo.

The controller 230 may determine an electrode lifetime of the electrodes 311a and 311b of the PO laser chamber 310 in the PO 300 based on the charge voltage Vhvpo and the pulse energy Epo. A detail of a prediction method will be described later on.

When a chamber having been installed in the MO 200 is then installed in the PO 300, the electrode lifetime of the electrodes may be predicted based on the charge voltage Vhvmo, the pulse energy Emo, the charge voltage Vhvpo and the pulse energy Epo. A detail of a prediction method will be described later on.

In such case, even when a chamber is moved from the MO 200 to the PO 300, it is possible to predict the electrode lifetime of the electrodes accurately.

3.3 Prediction Method of Electrode Life in Double Chamber System

Figure 13:
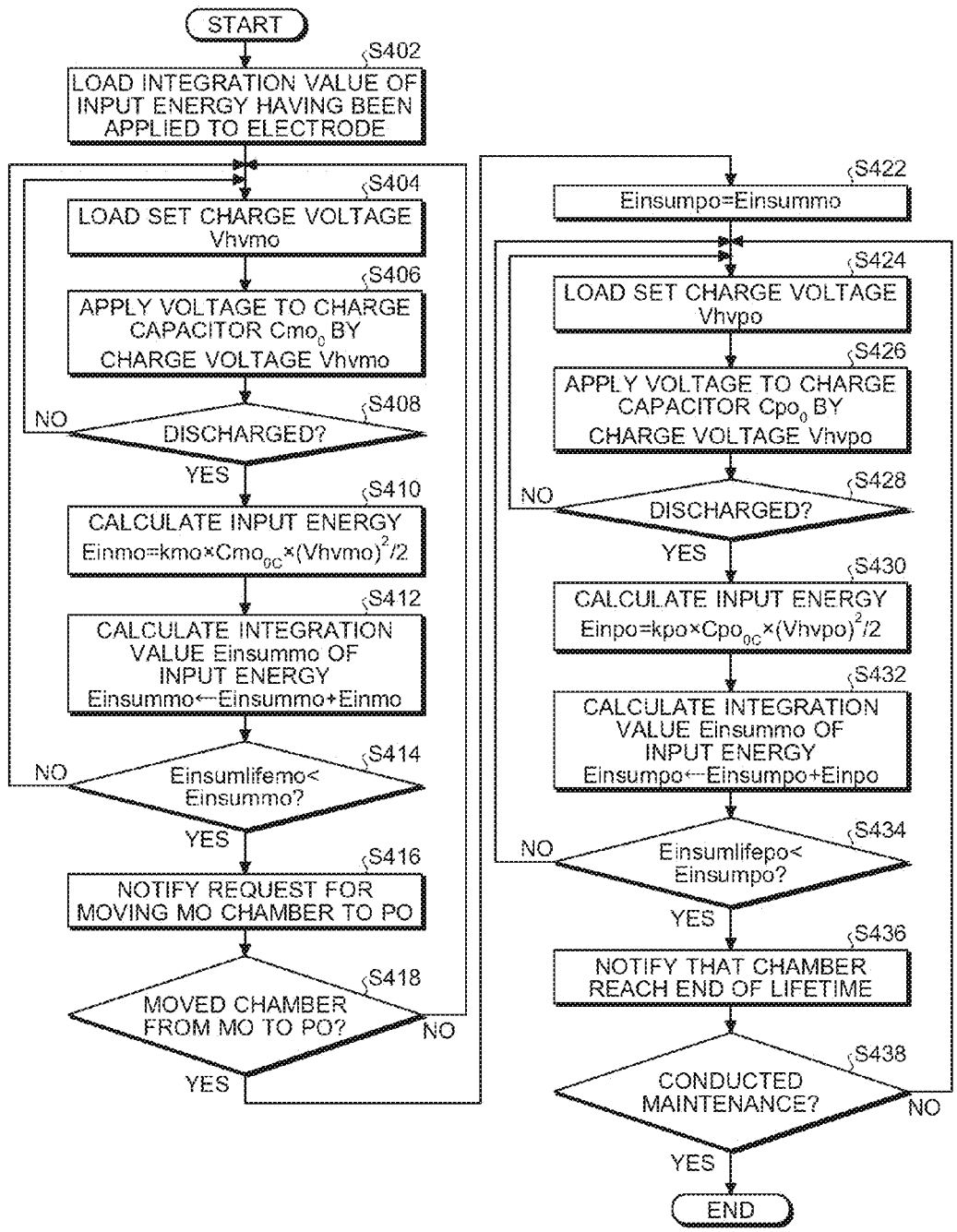
FIG. 13 is a flowchart for explaining a control method of the double chamber laser apparatus according to the disclosure.

Using FIG. 13, a prediction method of an electrode lifetime of the double chamber excimer laser apparatus being at least a part of a method of controlling a laser apparatus will be explained. In a main part of a prediction method of the electrodes of the double chamber excimer laser apparatus, the prediction method explained using FIG. 5 is applied to both of the MO 200 and the PO 300, respectively.

Firstly, in step S402, the controller 30 may load an integration value of energy having been applied to the electrodes 211a and 211b, and define the loaded integration value of input energy as an integration value Einsummo of input energy. The integration value of energy having been applied to the electrodes 211a and 211b may be an integration value of energy applied to the electrodes 211a and 211b until the MO laser chamber 210 is installed in the laser apparatus. In particular, there is a case where the electrodes 211a and 211b have been used for discharge in a different laser apparatus. When the electrodes 211a and 211b have not been used for discharge, the integration value Einsummo of input energy may be defined as 0.

Then, in step S404, the controller 230 may load a charge voltage Vhvmo set up in the MO charger 212.

Then, in step S406, the controller 230 may apply the voltage Vhvmo to the capacitor $Cmo_0$ using the MO charger 212. A capacitance of the capacitor is $Cmo_{0c}$.

Then, in step S408, the controller 230 may determine whether a discharge occurred between the electrodes 211a and 211b in the MO laser chamber 210 or not. When the controller 230 determines as that a discharge occurred, the controller 230 may progress to step S410. On the other hand, when the controller 230 determines as that a discharge did not occurred, the controller 230 may progress to step S404. The determination whether a discharge occurred may be conducted as the following. For example, it may be determined based on whether a trigger signal is transmitted to the switch 213a or not. Alternatively, it may be determined based on whether a laser beam is detected by the MO energy monitor unit 217 or not.

Then, in step S410, the controller 230 may calculate an input energy Einmo. Specifically, the controller 230 may calculate the input energy Einmo based on the following formula (10). Here, kmo is a coefficient.

$$Einmo = kmo \times Cmo_{0C} \times (Vhvmo)^2/2 \quad (10)$$

Then, in step S412, the controller 230 may calculate a new integration value Einsummo of input energy by adding the input energy Einmo calculated in step S410 to the current integration value Einsummo of input energy.

Then, in step S414, the controller 230 may determine whether the integration value Einsummo of input energy exceeds an integration lifetime value Einsumlifemo of input energy o the MO 200 or not. When the controller 230 determines as that the integration value Einsummo of input energy exceeds the integration lifetime value Einsumlifemo of input energy, the controller 230 may progress to step S416. On the other hand, when the controller 230 determines as that the integration value Einsummo of input energy does not exceed the integration lifetime value Einsumlifemo of input energy, the controller 230 may progress to step S404.

Then, in step S416, the controller 230 may notify an external device that the MO laser chamber 210 reaches the end of its lifetime because the electrodes 211a and 211b reach the end of their lifetime. In step S416, the controller 230 may transmit a request for moving the electrodes 211a and 211b in the MO laser chamber 210 to the PO laser chamber 310 to the external device. After that, the chamber used for the MO laser chamber 210 may be moved to the PO laser chamber 310.

Then, in step S418, in order to use a chamber used for the MO laser chamber 210 as the PO laser chamber 310, the controller 230 may determine whether the chamber is moved or not. When the controller 230 determines as that the chamber is moved, the controller 230 may progress to step S422. On the other hand, when the controller 230 determines as that the chamber is not moved, the controller 230 may progress to step S404.

Then, in step S422, the controller 30 may define the integration value Einsummo of input energy having been applied to the electrodes 211a and 211b as an integration value Einsumpo of input energy having been applied to the electrodes 311a and 311b. Here, because the chamber used for the MO laser chamber 210 is moved in order to use the chamber as the PO laser chamber 310, the chamber having being the MO laser chamber 210 is the same as the chamber currently being the PO laser chamber 310. However, for the purpose of explanation, different reference numbers are arranged to them.

Then, in step S424, the controller 230 may load the charge voltage Vhvpo set up in the PO charger 312.

Then, in step S426, the controller 230 may apply the voltage Vhvpo to the capacitor $Cpo_0$ using the PO charger 312. A capacitance of the capacitor $Cpo_0$ is $Cpo_{0c}$.

Then, in step S428, the controller 230 may determine whether a discharge occurs between the electrodes 311a and 311b in the PO laser chamber 310 or not. When the controller 230 determines as that a discharge occurred, the controller 230 may progress to step S430. On the other hand, when the controller 230 determines as that a discharge did not occurred, the controller 230 may progress to step S424. The determination whether a discharge occurred may be conducted as the following. For example, it may be determined based on whether a trigger signal is transmitted to the switch 313a or not. Alternatively, it may be determined based on whether a laser beam is detected by the PO energy monitor unit 317 or not.

Then, in step S430, the controller 230 may calculate an input energy Einpo. Specifically, the controller 230 may calculate the input energy Einpo based on the following formula (11). Here, kpo is a coefficient.

$$Einpo = kpo \times Cpo_{0C} \times (Vhvpo)^2/2 \qquad (11)$$

Then, in step S432, the controller 230 may calculate a new integration value Einsumpo of input energy by adding the input energy Einpo calculated in step S430 to the current integration value Einsumpo of input energy.

Then, in step S434, the controller 230 may determine whether the integration value Einsumpo of input energy exceeds an integration lifetime value Einsumlifepo of input energy or not. When the controller 230 determines as that the integration value Einsumpo of input energy exceeds the integration lifetime value Einsumlifepo of input energy, the controller 230 may progress to step S436. On the other hand, when the controller 230 determines as that the integration value Einsumpo of input energy does not exceed the integration lifetime value Einsumlifepo of input energy, the controller 230 may progress to step S424.

Then, in step S436, the controller 230 may notify an external device that the laser chamber 310 reaches the end of its lifetime because the electrodes 311a and 311b reach the end of their lifetime. The controller 230 may display a message for notifying that the laser chamber 310 reaches the end of its lifetime on an operation panel, or the like, instead of the notification to the external device.

Then, in step S438, the controller 230 may determine whether maintenance such as a chamber exchange, or the like, was conducted or not. When the controller 230 determined that maintenance was conducted, the controller 230 may finish this flow of the method of predicting an electrode lifetime. On the other hand, when the controller 230 determined that maintenance was not conducted, the controller 230 may progress to step S424. When the maintenance is a chamber exchange, the controller 230 may confirm a serial number of the PO laser chamber 310, and determine whether the chamber exchange was conducted or not based on whether the serial number is different or not.

Another method of calculating input energy will be explained. The MO PPM 213 and the PO PPM 313 may have the same circuit as the circuit shown in FIG. 3. Differences between the MO PPM 213, the PO PPM 313 and the circuit shown in FIG. 3 are an inductance of each magnetic switch and a capacitance of each capacitor.

The input energy Einmo may be calculated based on a voltage value of the capacitor $Cmo_0$ measured by a voltage indicator (not shown). In such case, a measurement of a voltage of the capacitor $Cmo_0$ by the voltage indicator may be additionally executed in step S408, or the like. The input energy Einmo may be calculated by replacing the charge voltage Vhvmo with a voltage measured by the voltage indicator multiplied by a specific coefficient, if necessary.

The input energy Einpo may be calculated based on a voltage value of the capacitor $Cpo_0$ measured by a voltage indicator (not shown). In such case, a measurement of a voltage of the capacitor $Cpo_0$ by the voltage indicator may be additionally executed in step S428, or the like. The input energy Einpo may be calculated by replacing the charge voltage Vhvpo with a voltage measured by the voltage indicator multiplied by a specific coefficient, if necessary.

Yet another method of calculating input energy will be explained.

The input energy Einmo may be calculated based on a voltage value between the electrodes 211a and 211b measured by a voltage indicator (not shown) and a current value measured by a current indicator (not shown) at the time of discharge. In such case, measurements of a voltage and a current by the voltage indicator and the current indicator may be additionally executed in step S408, or the like. The input energy Einmo may be calculated by multiplying a product of the voltage measured by the voltage indicator and the current measured by the current indicator by a specific coefficient, if necessary.

The input energy Einpo may be calculated based on a voltage value between the electrodes 311a and 311b measured by a voltage indicator (not shown) and a current value measured by a current indicator (not shown) at the time of discharge. In such case, measurements of a voltage and a current by the voltage indicator and the current indicator may be additionally executed in step S428, or the like. The input energy Einpo may be calculated by multiplying a product of the voltage measured by the voltage indicator and the current measured by the current indicator by a specific coefficient, if necessary. In the above description, in step S416, the case where the electrode lifetime is defined as the chamber lifetime and the chamber used as the MO laser chamber 210 is moved in order to be used as the PO laser chamber 310 is explained. However, it is also possible to exchange the electrode instead of the exchange of the chamber, and when it is possible to obtain a desired laser performance by adjusting a gap between the electrodes, it is also possible to adjust the gap between the electrodes instead of the exchange of the chamber.

Furthermore, in the above description, although the case where the chamber used as the MO laser chamber 210 is used as the PO laser chamber 310 has been explained, a case where the chamber used as the PO laser chamber 310 is used as the MO laser chamber 210 is also possible.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:
1. A laser apparatus comprising:
a laser chamber filled with a laser gain medium;
a pair of electrodes disposed in the laser chamber;
a charger configured to apply a charge voltage for causing a discharge to occur between the pair of the electrodes;

a pulse power module configured to convert the charge voltage applied by the charger into a short pulsed voltage, and apply the short pulsed voltage between the pair of the electrodes; and a controller configured to calculate input energies Ein applied to the pair of the electrodes based on the charge voltage, calculate an integration value Einsum of the input energies Ein by integrating the calculated input energies Ein, and determine whether the integration value Einsum exceeds an integration lifetime value Einsumlife or not, wherein the integration lifetime value Einsumlife is calculated from an electrode consumption amount Rdlife, an area S of discharge surfaces of the pair of electrodes, and a consumption rate coefficient $\alpha$ of the pair of the electrodes.

2. A laser apparatus comprising:
a laser chamber filled with a laser gain medium;
a pair of electrodes disposed in the laser chamber;
a charger configured to apply a charge voltage for causing a discharge to occur between the pair of the electrodes; and
a controller configured to calculate input energies Ein applied to the pair of the electrodes based on the charge voltage, calculate an integration value Einsum of the input energies Ein by integrating the calculated input energies Ein, and determine whether the integration value Einsum exceeds an integration lifetime value Einsumlife or not,
wherein the integration lifetime value Einsumlife is calculated from an electrode consumption amount Rdlife, an area S of discharge surfaces of the pair of electrodes, and a consumption rate coefficient $\alpha$ of the pair of the electrodes.

3. A laser apparatus comprising:
a laser chamber filled with a laser gain medium;
a pair of electrodes disposed in the laser chamber;
a charger configured to apply a charge voltage for causing a discharge to occur between the pair of the electrodes;
a pulse power module configured to convert the charge voltage applied by the charger into a short pulsed voltage, and apply the short pulsed voltage between the pair of the electrodes;
a voltage indicator configured to measure a value of the charge voltage applied by the charger; and
a controller configured to calculate input energies Ein applied to the pair of the electrodes based on the measured value of the charge voltage, calculate an integration value Einsum of the input energies Ein by integrating the calculated input energies Ein, and determine whether the integration value Einsum exceeds an integration lifetime value Einsumlife or not,
wherein the integration lifetime value Einsumlife is calculated from an electrode consumption amount Rdlife, an area S of discharge surfaces of the pair of electrodes, and a consumption rate coefficient $\alpha$ of the pair of the electrodes.

4. A laser apparatus comprising:
a laser chamber filled with a laser gain medium;
a pair of electrodes disposed in the laser chamber;
a charger configured to apply a charge voltage for causing a discharge to occur between the pair of the electrodes;
a pulse power module configured to convert the charge voltage applied by the charger into a short pulsed voltage, and apply the short pulsed voltage between the pair of the electrodes;
a voltage indicator configured to measure a value of the charge voltage applied by the charger;
a current indicator configured to measure a current flowing through the pair of the electrodes; and
a controller configured to calculate input energies Ein applied to the pair of the electrodes based on the measured values of the charge voltage and the current, calculate an integration value Einsum of the input energies Ein by integrating the calculated input energies Ein, and determine whether the integration value Einsum exceeds an integration lifetime value Einsumlife or not, wherein
the integration lifetime value Einsumlife is calculated from an electrode consumption amount Rdlife, an area S of discharge surfaces of the pair of electrodes, and a consumption rate coefficient $\alpha$ of the pair of the electrodes.

5. A method of controlling a laser apparatus including:
setting a current integration value Einsum of input energies;
setting a charge voltage to be applied to a pulse power module connected to a pair of electrodes for exciting a laser gain medium capable of emitting laser light in order to cause a discharge to occur between the pair of the electrodes;
applying the set charge voltage to the pair of the electrodes from the pulse power module in order to cause a discharge to occur between the electrodes;
calculating a new input energy Ein based on the set charge voltage;
calculating a new integration value Einsum of input energies by adding the new input energy Ein to the current integration value Einsum; and
determining whether the new integration value Einsum exceeds an integration lifetime value Einsumlife or not,
wherein the integration lifetime value Einsumlife is calculated from an electrode consumption amount Rdlife, an area S of discharge surfaces of the pair of electrodes, and a consumption rate coefficient $\alpha$ of the pair of the electrodes.

6. The method according to claim 5, wherein
the current integration value Einsum is set by
loading an integration value of the input energies having been applied to the pair of the electrodes, and defining the loaded integration value of the input energies as the current integration value Einsum of the input energies.

7. A method of controlling a laser apparatus including:
setting a current integration value Einsum of input energies;
setting a charge voltage for applying a voltage for discharge to a pair of electrode for exciting a laser gain medium capable of emitting laser light;
causing a discharge to occur between the pair of the electrodes;
calculating a new input energy Ein based on the set charge voltage;
calculating a new integration value Einsum of input energies by adding the new input energy Ein to the current integration value Einsum; and
determining whether the new integration value Einsum exceeds an integration lifetime value Einsumlife or not,
wherein the integration lifetime value Einsumlife is calculated from an electrode consumption amount Rdlife, an area S of discharge surfaces of the pair of electrodes, and a consumption rate coefficient $\alpha$ of the pair of the electrodes.

8. The method according to claim 7, wherein
the current integration value Einsum is set by
loading an integration value of the input energies having been applied to the pair of the electrodes, and
defining the loaded integration value of the input energies as the current integration value Einsum of the input energies.

9. A method of controlling a laser apparatus including:
setting a current integration value Einsum of input energies;
setting a charge voltage to be applied to a pulse power module connected to a pair of electrodes for exciting a laser gain medium capable of emitting laser light in order to cause a discharge to occur between the pair of the electrodes;
applying the set charge voltage to the pair of the electrodes from the pulse power module in order to cause a discharge to occur between the electrodes;
measuring the charge voltage;
calculating a new input energy Ein based on the measured charge voltage;
calculating a new integration value Einsum of input energies by adding the new input energy Ein to the current integration value Einsum; and
determining whether the new integration value Einsum exceeds an integration lifetime value Einsumlife or not,
wherein the integration lifetime value Einsumlife is calculated from an electrode consumption amount Rdlife, an area S of discharge surfaces of the pair of electrodes, and a consumption rate coefficient $\alpha$ of the pair of the electrodes.

10. The method according to claim 9, wherein
the current integration value Einsum is set by
loading an integration value of the input energies having been applied to the pair of the electrodes, and
defining the loaded integration value of the input energies as the current integration value Einsum of the input energies.

11. A method of controlling a laser apparatus including:
setting a current integration value Einsum of input energies;
setting a charge voltage to be applied to a pulse power module connected to a pair of electrodes for exciting a laser gain medium capable of emitting laser light in order to cause a discharge to occur between the pair of the electrodes;
applying the set charge voltage to the pair of the electrodes from the pulse power module in order to cause a discharge to occur between the electrodes;
measuring the charge voltage applied to the pair of the electrodes and a current flowing through the pair of the electrodes;
calculating a new input energy Ein based on the measured voltage and the measured current;
calculating a new integration value Einsum of input energies by adding the new input energy Ein to the current integration value Einsum; and
determining whether the new integration value Einsum exceeds an integration lifetime value Einsumlife or not,
wherein the integration lifetime value Einsumlife is calculated from an electrode consumption amount Rdlife, an area S of discharge surfaces of the pair of electrodes, and a consumption rate coefficient $\alpha$ of the pair of the electrodes.

12. The method according to claim 11, wherein
the current integration value Einsum is set by
loading an integration value of the input energies having been applied to the pair of the electrodes, and
defining the loaded integration value of the input energies as the current integration value Einsum of the input energies.

* * * * *